(12) United States Patent
Holzman et al.

(10) Patent No.: US 10,165,224 B2
(45) Date of Patent: *Dec. 25, 2018

(54) COMMUNICATION COLLABORATION

(71) Applicant: Accenture Global Services Limited, Dublin (IE)

(72) Inventors: Michael A. Holzman, Chicago, IL (US); Charles Nebolsky, Northbrook, IL (US); Jon Walheim, San Francisco, CA (US); Steven W. Diamond, San Antonio, TX (US); Frank O. Redey, Bolingbrook, IL (US); Larry M. Socher, Vienna, VA (US); Christopher J. Pierce, Chicago, IL (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 28 days.

This patent is subject to a terminal disclaimer.

(21) Appl. No.: 14/968,370

(22) Filed: Dec. 14, 2015

(65) Prior Publication Data

US 2016/0100130 A1    Apr. 7, 2016

Related U.S. Application Data

(63) Continuation of application No. 13/789,270, filed on Mar. 7, 2013, now Pat. No. 9,240,970.

(Continued)

(51) Int. Cl.
*H04N 7/14* (2006.01)
*H04L 12/58* (2006.01)
(Continued)

(52) U.S. Cl.
CPC ......... *H04N 7/147* (2013.01); *H04L 12/1818* (2013.01); *H04L 12/1822* (2013.01);
(Continued)

(58) Field of Classification Search
CPC ............... H04L 51/066; H04L 12/1818; H04L 65/1069; H04L 65/4015; H04L 12/18;
(Continued)

(56) References Cited

U.S. PATENT DOCUMENTS 4,633,245 A   12/1986  Blount et al.
4,907,260 A   3/1990   Prohs et al.
(Continued)

FOREIGN PATENT DOCUMENTS

EP   0902380    3/1999
EP   0950964    10/1999
(Continued)

OTHER PUBLICATIONS

Chinese Office Action, dated Mar. 13, 2009, for co-pending Chinese Patent Application No. 200610149468.2.
(Continued)

*Primary Examiner* — Chirag R Patel
(74) *Attorney, Agent, or Firm* — Mannava & Kang, P.C.

(57) ABSTRACT

A communication collaboration system may include a memory storing machine readable instructions to receive a first signal representing a first mode of communication for a user. The communication collaboration system may further include machine readable instructions to seamlessly escalate the first signal to a second signal representing a second mode of communication for the user. The second mode of communication may be different from the first mode of communication. The communication collaboration system may further include a processor to implement the machine readable instructions.

18 Claims, 15 Drawing Sheets

Related U.S. Application Data

(60) Provisional application No. 61/607,870, filed on Mar. 7, 2012.

(51) Int. Cl.
*H04L 29/06* (2006.01)
*H04L 12/18* (2006.01)

(52) U.S. Cl.
CPC ........ *H04L 12/1836* (2013.01); *H04L 51/066* (2013.01); *H04L 51/36* (2013.01); *H04L 65/1059* (2013.01); *H04L 65/403* (2013.01); *H04L 65/601* (2013.01)

(58) Field of Classification Search
CPC ............... H04L 65/403; H04L 12/1822; H04L 65/1059; H04N 7/147; H04N 7/15
See application file for complete search history.

(56) References Cited

U.S. PATENT DOCUMENTS

| | | |
|---|---|---|
| 5,265,065 A | 11/1993 | Turtle |
| 5,535,325 A | 7/1996 | Cattell et al. |
| 5,644,740 A | 7/1997 | Kiuchi et al. |
| 5,883,946 A | 3/1999 | Beck et al. |
| 5,905,715 A | 5/1999 | Azarmi et al. |
| 5,910,984 A | 6/1999 | Low |
| 5,953,723 A | 9/1999 | Linoff et al. |
| 5,954,799 A | 9/1999 | Goheen et al. |
| 5,960,430 A | 9/1999 | Haimowitz et al. |
| 5,987,037 A | 11/1999 | Gans |
| 5,995,610 A | 11/1999 | Smidt et al. |
| 6,002,756 A | 12/1999 | Lo et al. |
| 6,026,424 A | 2/2000 | Circenis |
| 6,065,009 A | 5/2000 | Leymann et al. |
| 6,076,093 A | 6/2000 | Pickering |
| 6,122,363 A | 9/2000 | Friedlander et al. |
| 6,140,586 A | 10/2000 | Imani |
| 6,229,883 B1 | 5/2001 | Kakizaki et al. |
| 6,233,571 B1 | 5/2001 | Egger et al. |
| 6,256,032 B1 | 7/2001 | Hugh |
| 6,263,370 B1 | 7/2001 | Kirchner et al. |
| 6,282,683 B1 | 8/2001 | Dapper et al. |
| 6,397,231 B1 | 5/2002 | Salisbury et al. |
| 6,434,558 B1 | 8/2002 | Macleod et al. |
| 6,449,341 B1 | 9/2002 | Adams et al. |
| 6,453,356 B1 | 9/2002 | Sheard et al. |
| 6,460,034 B1 | 10/2002 | Wical |
| 6,493,695 B1 | 12/2002 | Pickering et al. |
| 6,714,987 B1 | 3/2004 | Amin et al. |
| 6,775,262 B1 | 8/2004 | Skog |
| 6,807,181 B1 | 10/2004 | Weschler |
| 6,910,074 B1 | 6/2005 | Amin et al. |
| 6,980,137 B2 | 12/2005 | Parry et al. |
| 6,985,569 B2 | 1/2006 | Baker |
| 7,000,032 B2 | 2/2006 | Kloba et al. |
| 7,047,236 B2 | 5/2006 | Conroy et al. |
| 7,065,588 B2 | 6/2006 | Konda et al. |
| 7,092,696 B1 | 8/2006 | Hosain et al. |
| 7,103,165 B2 | 9/2006 | Baniak et al. |
| 7,140,025 B1 | 11/2006 | Dillow et al. |
| 7,222,088 B2 | 5/2007 | Nishikado et al. |
| 7,310,532 B2 | 12/2007 | Knauerhase et al. |
| 7,506,040 B1 | 3/2009 | Rabe et al. |
| 7,526,459 B2 | 4/2009 | Flinn et al. |
| 7,552,323 B2 | 6/2009 | Shay |
| 7,574,495 B1 | 8/2009 | Rajagopalan |
| 7,606,444 B1* | 10/2009 | Erol .................. G06K 9/00711 382/305 |
| 7,895,209 B2 | 2/2011 | Spence et al. |
| 8,086,575 B2 | 12/2011 | Putterman et al. |
| 8,144,187 B2* | 3/2012 | Moore .................. H04N 7/152 348/14.09 |
| 8,145,678 B2 | 3/2012 | Ramsay, Jr. et al. |
| 8,301,477 B2 | 10/2012 | Allam et al. |
| 8,768,751 B2 | 7/2014 | Paharia |
| 8,768,764 B1 | 7/2014 | Jakowski et al. |
| 8,775,656 B2 | 7/2014 | Arora et al. |
| 8,908,699 B2 | 12/2014 | Karaoguz et al. |
| 9,094,525 B2* | 7/2015 | Dye ..................... H04M 3/568 |
| 2002/0023176 A1 | 2/2002 | Kwicinski |
| 2002/0035617 A1 | 3/2002 | Lynch et al. |
| 2002/0046296 A1 | 4/2002 | Kloba et al. |
| 2002/0065856 A1 | 5/2002 | Kisiel |
| 2002/0156874 A1 | 10/2002 | Suorsa et al. |
| 2002/0157017 A1 | 10/2002 | Mi et al. |
| 2002/0168962 A1 | 11/2002 | Kurakake et al. |
| 2003/0005034 A1 | 1/2003 | Amin |
| 2003/0023472 A1 | 1/2003 | Lee et al. |
| 2003/0061330 A1 | 3/2003 | Frisco et al. |
| 2003/0065777 A1 | 4/2003 | Mattila et al. |
| 2003/0070176 A1 | 4/2003 | Parker et al. |
| 2003/0078874 A1 | 4/2003 | Cope |
| 2003/0090514 A1 | 5/2003 | Cole et al. |
| 2003/0154179 A1 | 8/2003 | Mercer |
| 2003/0172272 A1 | 9/2003 | Ehlers et al. |
| 2004/0015366 A1 | 1/2004 | Wiseman et al. |
| 2004/0015486 A1 | 1/2004 | LianQ et al. |
| 2004/0019900 A1 | 1/2004 | Knightbridge et al. |
| 2004/0032393 A1* | 2/2004 | Brandenberg ...... G06F 17/3087 345/156 |
| 2004/0034723 A1* | 2/2004 | Giroti .................. H04L 12/1822 710/8 |
| 2004/0088417 A1 | 5/2004 | Bober et al. |
| 2004/0090472 A1 | 5/2004 | Risch et al. |
| 2004/0102990 A1 | 5/2004 | Jones |
| 2004/0111506 A1 | 6/2004 | Kundu et al. |
| 2004/0133486 A1 | 7/2004 | Markki et al. |
| 2004/0133627 A1 | 7/2004 | Kalyanaraman et al. |
| 2004/0139166 A1 | 7/2004 | Collison |
| 2004/0143477 A1 | 7/2004 | Wolff |
| 2004/0151192 A1 | 8/2004 | Trossen |
| 2004/0153404 A1 | 8/2004 | Rischmueller et al. |
| 2004/0183829 A1 | 9/2004 | Kontny et al. |
| 2004/0186762 A1 | 9/2004 | Beaven et al. |
| 2004/0186824 A1 | 9/2004 | Delic et al. |
| 2004/0186842 A1 | 9/2004 | Wesemann |
| 2004/0249910 A1 | 12/2004 | Jerbi et al. |
| 2004/0255043 A1 | 12/2004 | Randy et al. |
| 2005/0027585 A1 | 2/2005 | Wodtke et al. |
| 2005/0037752 A1 | 2/2005 | Kwan et al. |
| 2005/0038869 A1 | 2/2005 | Zimler et al. |
| 2005/0043940 A1 | 2/2005 | Eider |
| 2005/0060643 A1 | 3/2005 | Glass et al. |
| 2005/0073999 A1 | 4/2005 | Koch |
| 2005/0091370 A1 | 4/2005 | Wietfeld |
| 2005/0095569 A1 | 5/2005 | Franklin |
| 2005/0102675 A1 | 5/2005 | Parkyn |
| 2005/0114367 A1 | 5/2005 | Serebrennikov |
| 2005/0149724 A1 | 7/2005 | Graff |
| 2005/0160135 A1 | 7/2005 | Yokoro |
| 2005/0165930 A1 | 7/2005 | Whitman |
| 2005/0175021 A1 | 8/2005 | Ozuqur et al. |
| 2005/0185661 A1 | 8/2005 | Scott et al. |
| 2005/0223064 A1 | 10/2005 | Salerno et al. |
| 2005/0228906 A1 | 10/2005 | Kubota |
| 2005/0262191 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2006/0026108 A1 | 2/2006 | Wilson et al. |
| 2006/0047709 A1 | 3/2006 | Belin et al. |
| 2006/0101474 A1 | 5/2006 | Magown |
| 2006/0195778 A1 | 8/2006 | Bendik |
| 2006/0209768 A1 | 9/2006 | Yan et al. |
| 2007/0047533 A1 | 3/2007 | Criddle et al. |
| 2007/0050340 A1 | 3/2007 | von Kaenel et al. |
| 2007/0067385 A1 | 3/2007 | D'Angelo et al. |
| 2007/0100875 A1 | 5/2007 | Chi et al. |
| 2007/0118648 A1 | 5/2007 | Millefiorini et al. |
| 2007/0124185 A1 | 5/2007 | Elkin et al. |
| 2007/0150480 A1 | 6/2007 | Hwang et al. |
| 2007/0162324 A1 | 7/2007 | Suzuki et al. |

(56) References Cited

U.S. PATENT DOCUMENTS

| | | | |
|---|---|---|---|
| 2007/0162907 A1 | 7/2007 | Herlocker et al. | |
| 2007/0240046 A1 | 10/2007 | Yan et al. | |
| 2007/0242819 A1 | 10/2007 | Bozionek et al. | |
| 2007/0274291 A1 | 11/2007 | Diomelli | |
| 2007/0276714 A1 | 11/2007 | Beringer | |
| 2008/0004927 A1 | 1/2008 | Haller et al. | |
| 2008/0077680 A1 | 3/2008 | Dellarole et al. | |
| 2008/0091496 A1 | 4/2008 | Gurpinar et al. | |
| 2008/0117917 A1 | 5/2008 | Baylay et al. | |
| 2008/0120240 A1 | 5/2008 | Ginter et al. | |
| 2008/0127041 A1 | 5/2008 | Gura | |
| 2008/0133415 A1 | 6/2008 | Ginter et al. | |
| 2008/0155425 A1 | 6/2008 | Murthy et al. | |
| 2008/0228774 A1 | 9/2008 | Hamilton et al. | |
| 2008/0229213 A1 | 9/2008 | Hamilton et al. | |
| 2008/0229214 A1 | 9/2008 | Hamilton et al. | |
| 2008/0312992 A1 | 12/2008 | Hoshi et al. | |
| 2009/0112655 A1 | 4/2009 | Stuhec et al. | |
| 2009/0119572 A1 | 5/2009 | Koivunen | |
| 2009/0138257 A1 | 5/2009 | Verma et al. | |
| 2009/0235182 A1 | 9/2009 | Kagawa et al. | |
| 2010/0057682 A1 | 3/2010 | Ramsay et al. | |
| 2010/0121859 A1 | 5/2010 | Maeda et al. | |
| 2010/0138231 A1 | 6/2010 | Linthicum et al. | |
| 2010/0169233 A1 | 7/2010 | Forbes et al. | |
| 2010/0235216 A1* | 9/2010 | Hehmeyer | G06Q 10/06316 705/7.26 |
| 2010/0262557 A1 | 10/2010 | Ferreira et al. | |
| 2011/0054899 A1* | 3/2011 | Phillips | G10L 15/30 704/235 |
| 2011/0137702 A1 | 6/2011 | Hodges et al. | |
| 2011/0179045 A1 | 7/2011 | Caldwell et al. | |
| 2011/0242426 A1 | 10/2011 | Cho et al. | |
| 2011/0288897 A1 | 11/2011 | Erhart et al. | |
| 2012/0185610 A1* | 7/2012 | Chen | H04N 21/2365 709/246 |
| 2012/0215705 A1 | 8/2012 | Porro et al. | |
| 2012/0216125 A1 | 8/2012 | Pierce | |
| 2012/0230404 A1* | 9/2012 | Cote | H04N 7/26861 375/240.12 |
| 2013/0073280 A1 | 3/2013 | O'Neil et al. | |
| 2013/0073343 A1 | 3/2013 | Richardson et al. | |
| 2014/0025441 A1 | 1/2014 | Eberlain et al. | |
| 2015/0365356 A1* | 12/2015 | Liaw | H04L 49/30 370/466 |

FOREIGN PATENT DOCUMENTS

| | | | |
|---|---|---|---|
| EP | 0980175 | 2/2000 | |
| EP | 1052841 | 11/2000 | |
| EP | 1418743 | 5/2004 | |
| EP | 1619618 | 1/2006 | |
| EP | 1699009 | 9/2006 | |
| EP | 1764972 | 3/2007 | |
| JP | 11-219340 | 8/1999 | |
| JP | 2001-224000 | 8/2001 | |
| JP | 2002-140309 | 5/2002 | |
| JP | 2003-060714 | 2/2003 | |
| JP | 2004-070733 | 3/2004 | |
| JP | 2004-260240 | 9/2004 | |
| JP | 2004-266310 | 9/2004 | |
| JP | 2004-297138 | 10/2004 | |
| JP | 2004-362061 | 12/2004 | |
| JP | 2005-004248 | 1/2005 | |
| JP | 2005-202631 | 7/2005 | |
| JP | 2005-039317 | 10/2005 | |
| JP | 2006-504297 | 2/2006 | |
| JP | 2006-510328 | 3/2006 | |
| WO | WO 2002/091194 | 11/2002 | |
| WO | WO 03/025809 | 3/2003 | |
| WO | WO 03/069506 | 6/2004 | |
| WO | WO 2004/102396 | 11/2004 | |
| WO | WO2007/095275 | * 8/2007 | H04L 29/06 |
| WO | WO-2008-112002 A2 | 9/2008 | |
| WO | WO 2010136904 | 12/2010 | |

OTHER PUBLICATIONS

English Translation of the Chinese Office Action, dated Mar. 13, 2009, for co-pending Chinese Patent Application No. 200610149468.2.

European Patent Office Search Report dated May 19, 2006 for co-pending European Patent Office Application No. 05425821.5.

European Patent Office Search Report dated May 10, 2006 for co-pending European Patent Office Application No. 05425824.9.

Indian Examination Report, dated Sep. 29, 2008, Indian Patent App. No. 1722/MUM/2006.

EPO Examination Report, dated May 19, 2006, EP Pat. No. 0542821.5.

EPO Examination Report, dated May 10, 2006, EP Pat. No. 0542824.9.

English translation of Japanese Official Action dated Apr. 6, 2009 for co-pending Japanese Patent Application No. 2006-319265.

Notification of Reason for Rejection dated Sep. 11, 2008 for co-pending Japanese Patent Application No. 2006-319265.

Canadian Patent Office dated Jun. 30, 2009 for co-pending Canadian Patent Application No. 2,567,906.

Communication for EP 05 425 824.9 dated Apr. 28, 2006.

European Patent Office Search Report dated Nov. 23, 2007 for co-pending European Patent Office Application No. 05425821.5.

European Patent Office Action with Search Report dated Jan. 2, 2006 for co-pending European Patent Office Application No. 05425765.

European Patent Office Action with Search Report dated Nov. 10, 2005 for co-pending European Patent Office Application No. 05425612.

European Patent Office Action with Search Report dated Feb. 14, 2006 for co-pending European Patent Office Application No. 05425656.

European Patent Office Action with Search Report dated Mar. 14, 2006 for co-pending European Patent Office Application No. 05425657.

Japanese Official Action dated Sep. 16, 2008 for JP 2006-319265 (with English translation).

Prosecution history of U.S. Appl. No. 11/127,776, downloaded Sep. 1, 2015.

Prosecution history of U.S. Appl. No. 11/313,441, downloaded Sep. 1, 2015.

Prosecution history of U.S. Appl. No. 11/313,463, downloaded Sep. 1, 2015.

Prosecution history of U.S. Appl. No. 11/313,496, downloaded Sep. 1 2015.

Prosecution history of U.S. Appl. No. 11/313,497, downloaded Sep. 1, 2015.

Prosecution history of U.S. Appl. No. 11/314,576, downloaded Sep. 1, 2015.

Prosecution history of U.S. Appl. No. 11/314,577, downloaded Sep. 1, 2015.

Prosecution history of U.S. Appl. No. 11/399,780, downloaded Sep. 1, 2015.

Prosecution history of U.S. Appl. No. 11/400,249, downloaded Sep. 1, 2015.

Prosecution history of U.S. Appl. No. 11/585,612, downloaded Sep. 1, 2015.

Prosecution history of U.S. Appl. No. 12/537,830, downloaded Sep. 1, 2015.

Feldman, R., Aumann, Y., Finkelstein-Landau, M., Hurvitz, E., Regev, Y., and Yaroshevich, A., "A Comparative Study of Information Extraction Strategies," 2002, pp. 1-12; XP-0.

Facebook For The Enterprise—http://www.appirio.com/products/facebookconnect.php, dated Jan. 22, 2013, (1p).

First Examiner's Report for Australian Application No. 2010206022 dated Mar. 30, 2011 (3p).

European Search Report for EP Application No. 11183845.4 dated Dec. 30, 2011 (7p).

Ponniah, P., ""Data Warehousing Fundamentals: A ComprehensiveGuide for IT Professionals,"" 2001, © 2001 John Wiley & Sons, Inc., pp. 257-289; ISBN 0-471-41254-6.

(56) References Cited

OTHER PUBLICATIONS

Liongosari, Edy, Dempski, K.; and Swaminathan, K.S., "In Search of a New Generation of Knowledge Management Applications," in ACM Siggroup Bulletin, pp. 1-4, (Jul. 1999).
Extended European Search Report; Application No. 09008688.5-1243; Oct. 6, 2009; 9 pg.
Extended European Search Report, dated Oct. 8, 2010, for co-pending European Patent Application No. 05425657.3,4 pages.
Canadian Office Action, dated Aug. 4, 2010, for co-pending Canadian Patent Application No. 2,559,647, 5 pages.
Green, S.J., "Building Hypertext Links by Computing Semantic Similarity" IEEE Transactions on Knowledge and Data Engineering, vol. 11, No. 5, Sep. 1999, pp. 713-730; XP-002317.
Social Ads—Amplify your content, Jan. 22, 2013, (1p).
The Authoritative Dictionary of IEEE Standard Terms, Seventh Edition, IEEE, published by Standards Information Network IEEE Press, year 2000. Cover and p. 46.
Japanese Office Action for JP-2006-284333, dated Jun. 28, 2010, with English translation, 30 pgs.
Japanese Office Action, dated Jan. 25, 2010,3 pgs.
English translation of Japanese Office Action, dated Jan. 25, 2010, 2 pgs.
Translation of Japanese Examination Report, dated Sep. 16, 2008, Japanese Pat. App. No. 2006-319265.
Indian Examination Report, dated Sep. 29, 2008, Indian Pat. App. No. 1722/MUM/2006.
EPO Examination Report, dated May 19, 2006, EP Pat. App. No. 05425821.5.
EPO Examination Report, dated May 10, 2006, EP Pat. App. No. 05425824.9.
Morelli, Filetti and Sacher; "The service delivery platform is dead. Long live SOP 2.0!"; accenture Outlook Point of View; May 2008, No. 1; 2 pq.
Morelli, Filetti; Accenture XP-001523010 "The Service Delivery Platform is Dead. Long Live SOP 2.0!"; Annual Review of Communications, vol. 61; 2008; pp. 551-554.
Shared Information/Data (SID) Model, Concepts, Principles ad Domains, TeleManagement Forum GB922, Dec. 2002.
H. Saggion et al. "Ontology-Based Information Extraction for Business Intelligence" (eBook: The Semantic Web, 6th International Semantic Web Conference, 2nd Asia Semantic Web Conference, Lecture Notes in Computer Science vol. 4825, Nov. 11-15, 2007, pp. 843-856).
Thuraisingham, B. and Hughes, E., "Data Quality: Developments and Directions," Integrity, Internal Control and Security in Information Systems. Connecting Governance and Technology. IPIP TCII/WG 11.5 Fourth Working Conference on Integrity and International Control in Information Systems, Kluwer Academic Publishers, Norweil, MA, USA, 2002, pp. 97-102; XP008067100.
The Parlay Group, Inc., The Parlay Goup: Web Services Working Group, "Parlay Web Services Application Deployment Infrastructure", pp. 1-21, Version 1.0, Oct. 31, 2002.
Sun Microsystems, Chapter 8, Authentication Options, Sun Java System Access Manager 6 2005QI Administration Guide, Sun Microsystems, pp. 1-25, Mar. 2005.
Sullivan, Dan, "Document Warehousing and Text Mining: Chapter 8; Loading and Transforming Documents", 2001, John Wiley & Sons; XP-002317590.
Storey et al., "Jambalaya: Interactive visualization to enhance ontology authoring and knowledge acquisition in Protege," 2001.
Silver et al., "Unified Network Presence Management," White Paper Nortel Networks, 2000, pp. 1-6.
Sheth, A., Aleman-Meza, B., Arpinar, I.B., Halaschek, C., Ramakrishnan, C., Clemens, B.. Warke, Y., Avant. D., Arpinar, F.S., Anyariwu, K. and Kochut, K., "Semantic Association Identification and Knowledge Discovery for National Security Applications," © To authors or their employers until publication. Jan. 31, 2004, pp. 1-16; To appear in Special Issue of Journal of Database Management on Database Technology for Enhancing National Security, 16(1) 33-53, Jan.-Mar. 2005; XP-002378976.

Sheth, A. Bertram, C., Avant, D., Hammond, B., Kochut, K., and Warke, Y., "Semantic Content Management for Enterprises and the Web," Submitted for review for IEEE Internet Computing, 2002, pp. 1-19; XP-002379806.
Sheth, A. Bertram, C., Avant, D., Hammond, B., Kochut, K., and Warke, Y., "Managing Semantic Content for the Web," IEEE Internet Computing, IEEE Service Center, New York, NY, Jul.-Aug. 2002, pp. 80-87; © 2002 IEEE.
Sheth A., et al., "Semantic Visualization: Interfaces for exploring and exploiting ontology, knowedgebase, heterogeneous content and complex relationships," Apr. 2004, pp. 1-9.
Seligman, L. and Rosenthal, A., ""XML's Impact on Databases and Data Sharing,"" Computer, IEEE Service Center, Los Alamitos, CA, vol. 34, No. 6, Jun. 2001, pp. 59-67; © 2001.
Quang Vinh Nguyen; Mao Lin Huang, "A Combined Visualization of Multiple Relational Structures in Shared Collaborative Workspaces—Multimedia Software Engineering, 2004 Proceedings. IEEE Sixth International Symposium on Miami, FL, Dec. 13, 2004, Piscataway, NJ, IEEE, Dec. 13, 2004, pp. 388-395."
Livingston et al., Remote Authentication Dial in User Service (RADIUS); IETF Standard-Working-Draft, Internet Engineering Task Force, IETF, Ch. vol. Radius, No. 5, Feb. 2000.
J. Strassner, et al., TMF White Paper on NGOSS and MDA, Version 1,0, Nov. 2003.
Australian Official Report, dated Dec. 17, 2007, for co-pending Australian Patent Application No. 2006236099.
Australian Official Report, dated Dec. 12, 2007, for co-pending Australian Patent Application No. 2006236096.
Australian Official Report, dated Oct. 26, 2007, for co-pending Australian Patent Application No. 2006220388.
Australian Official Report, dated Jan. 31, 2008, for co-pending Australian Patent Application No. 2006233229.
Chinese Office Action, dated Mar. 13, 2009, for co-pending Chinese Patent Application No. 200619149468.2.
English Translation of the Chinese Office Action, dated Mar. 13, 2009, for co-pending Chinese Patent Application No. 200619149468.2.
Chinese First Office Action dated Jul. 8, 2004, for co-pending Chinese Patent Application No. 200610139284.8.
European Patent Office Search Report dated May 12, 2006 for co-pending European Patent Office Application No. 05425821.5.
European Patent Office Search Report dated Feb. 14, 2006 for co-pending European Patent Office Application No. 05425656.5.
European Patent Office Search Report dated May 10, 2006 for co-pending European Patent Office Application No. 05425764.7.
European Patent Office Search Report dated Nov. 10, 2005 for co-pending European Patent Office Application No. 05425612.
European Patent Office Search Report dated Jan. 2, 2006 for co-pending European Patent Office Application No. 05425765.
Indian First Examination Report dated Oct. 17, 2008 for co-pending Indian Patent Application No. 1469/MUM/2006.
Indian First Examination Report dated Sep. 11, 2008 for co-pending Indian Patent Application No. 1490/MUM/2006.
Indian First Examination Report dated Sep. 29, 2008 for co-pending Indian Patent Application No. 1722/MUM/2006.
Japanese Official Action dated Sep. 11, 2008 for co-pending Japanese Patent Application No. 2006-319265.
Japanese Final Official Action dated Apr. 17, 2009 for co-pending Japanese Patent Application No. 2006-319265.
English translation of Japanese Official Action dated Apr. 17, 2009 for co-pending Japanese Patent Application No. 2006-319265.
Australian First Examination Report dated Jan. 3, 2008 for co-pending Australian Patent Application No. 2006220390.
Australian Second Examination Report dated Aug. 31, 2009 for co-pending Australian Patent Application No. 2006220390.
Translation of Japanese Examination Report, dated Sep. 16, 2008, Japanese Pat. App. 2006,319265.
Indian Examination Reoort, dated Sep. 29, 2008, Indian Patent App. No. 1722/MUM/2006.
EPO Examination Report, dated May 19, 2006, EP Pat. No. 05425821.5.
EPO Examination Report, dated May 10, 2006, EP Pat. No. 05425824.9.

(56) References Cited

OTHER PUBLICATIONS

J. Reilly, et al., eds., OSS Through Java Initiative, Core Business Entities Concepts and Principles, Feb. 2006.
Hammond, B., Sheth, A., Kochut, K., "Semantic Enhancement Engine: A Modular Document Enhancement Platform for Semantic Applications Over Heterogeneous Content," to appear in R.
Fluit, C. et al., "Towards the Semantic Web: Ontology-driven Knowledge Management," 2003, John Wiley & Sons, Ltd., pp. 145-159.
Droms, R., "RFC 1541 Dynamic Host Configuration Protocol," Internet, Oct. 1993, available from http://www.ietf.org/rfc1541.txt, 40 pages.
Japanese Office Action, dated Jan. 25, 2010,3 pgs. (From U.S. Appl. No. 11/313,497).
English translation of Japanese Office Action, dated Jan. 25, 2010, 2 pgs. (From U.S. Appl. No. 11/313,497).
The prosecution history of U.S. Appl. No. 11/313,441.
The prosecution history of U.S. Appl. No. 11/313,463.
The prosecution history of U.S. Appl. No. 11/313,496.
The prosecution history of U.S. Appl. No. 11/314,576.
The prosecution history of U.S. Appl. No. 11/314,577.
Anonymous, "3GPP: Technical Specification Group Services and System Aspects, Presence Service, Architecture and Functional Description," 3GPP TS 23.141 V6.0.0, Oct. 2002, pp. 1-31.
Angeles, Filar and MacKinnon, L.M., "Detection and Resolution of Data Inconsistencies, and Data Integration using Data Quality Criteria," QUATIC Proceeeings 2004, pp. 1-7; XP002392215.
Andrews, Keith, Ph.D., "Techniques from the field of Information Visualisation and their Potential Application to the AURIS Project," Information Visualisation for A URIS, Aug. 16, 2000, pp. i, ii and 1-19; © Keith Andrews.
Japanese Office Action for JP-2006-284334, dated Jan. 25, 2010, with English translation, 5 pqs.
Alani, H., "TGVizTab: An Ontology Visualisation Extension for Protege," Proceedings of Knowledge Capture, Workshop on Visualization Information in Knowledge Engineering, Sanibel Island, FL, 2003, pp. 1-6.
Rennisan, Earl, "Galaxy of News: An Approach to Visualizing and Understanding Expansive News Landscapes," in UIST'94, pp. 3-12, Nov. 2-4, 1994; © 1994 ACM 0-89791-657-3/94/0011.
Naumann, F., ""From Databases to Information Systems Information Quality Makes the Difference,"" Proceedings of the InternationalConference on Information Quality, 2001, pp. 1-17; XP002392340.
Lamping, John, Rao, R., and Pirolli, P., "A Focus+Context Technique Based on Hyperbolic Geometry for Visualizing Large Hierarchies," to Xerox Palo Alto Research Center, printed Mar. 7, 2002; © ACM.
Jennings, M., ""Enterprise Architecture View: Fingerprinting Data Warehouse Data,"" DMReview, Jan. 2003, pp. 1-4; XP-002379520.
Salesforce.come Unveils Salesforce Chatter—Enterprise Collaboration Meets the Real-Time Social Computing Model Loved by Millions on Facebook and Twitter—http://www.prnewsire.com/news-releases/salesforcecom-unveils-salesforce-chatter---enterprise-collaboration-meets-the-real-time-social-computing-modelloved-by-millions-on-facebook-and-twitter-70374242.html, dated Jan. 22, 2013, (4p).
LeFebvre, Richard, "Online Media Daily: Oracle Takes Social Marketing Seriously", Oracle CRM EMA Partner Community, Nov. 19, 2012, (1p).
Oracle Social Network—An Oracle White Paper, Oct. 2011. http://www.oracle.com/technetwork/middleware/webcenter/socialnetwork/overview/wp-oracle-social-network-2011-513258.pdf, (18p).
"Salesforce Radian6—Insights—Social Media is a Big Data—http://www.radian6.com/what-we-sell/marketingcloud/analysis-insights/ , Jan. 22, 2013, (1p)."
Salesforce Radian6—Engagement Console—Engagement Console, http://www.radian6.com/what-we-sell/marketingcloud/analysis-insights/ , Jan. 22, 2013, (4p).
Salesforce Radian6—Workflow and Automation—http://www.radian6.com/whatwesell/marketingcloud/analysis-insights/ , Jan. 22, 2013, (2p).
Salesforce Social Hub—Transform Your Business into a Socially Connected Enterprise, Jan. 22, 2013, (2p).
Data Super Friends: Can Social Medial and Enterprise Applications Team Up?—http://webcachegoogleusercontent.com/search?q-cache:60yJ4dxjL6YJ: http://gigaom . . . , dated Jan. 22, 2013, (8p).
OfficeXta-Social Enterprise Collaboration Platform—https://www.officexta.com/tag/features.do?p=1, dated Jan. 22, 2013, (2p).
SnapLogic—Social Media Integration: Cloud Data Integration Tools & Solutionshttp://www.snaplogic.com/what-we-do/solutions/social-media-integration.php, dated Jan. 22, 2013, (1p).
"SocialCast—Enterprise Social Networking, Enterprise Collaboration—http://www.socialcast.com/product, dated Jan. 22, 2013, (3p)."
SocialCast—Integrat Business Applications with Enterprise Social—http://www.socialcasUcom/social-network-integration, dated Jan. 22, 2013, (2p).
"Social Cast—Enterprise Social Networking Software & Activity Stream—http://www.socialcast.com/enterprise-social-network, dated Jan. 22, 2013, (2p)."
SAP Social Software—Video: Social Learning with SAP Jam and SuccessFactors Learning Management System by David Brockington (Dec. 12, 2012)—http://scn.sap.com/community/socials.
Appirio Helps Businesspeople Connect the Facebook Platform to Salesforce CRM—http://press.appirio.com/2008/1 O/appirio-helps-businesspeopleconnect.html, dated Jan. 22, 2013, (2p).
Yammer: What is Yammer—The First and Most Powerful Enterprise Social Network—https://www.yammer.com/product/, dated Jan. 22, 2013 (2p).
Yammer: Yammer Platform—What is Yammer—Integrate Your Business Applications—https://www.yammer.com/producUfeatures/yammer-platform/, dated Jan. 22, 2013, (3p).
Gamification 101: An Introduction to the Use of Game Dynamics to Influence Behavior, White Paper Bunchball Inc., Oct. 2010, retrieved online on Mar. 18, 2015 from http://bunchball.com/sites/defaulUfiles/downloads/gamification1 01.pdf.
Korba et al., "Automated social network analysis for collaborative work." (2006). 10 pages.
Wellman, "Computer networks as social networks." Science 293. 5537 (2001): 2031-2034.
Fisher et al., "Social and Tempural structures in everyday collaboration." Proceedings of the SIGCHI conference on Human factors in computing systems. ACM, 2004. 8 pages.
Dutra et al., "Using an inference Engine to Detect Conflicts in Collaborative Design." 14th International Conference on Concurrent Enterprising (ICE 2008)—Lisbon, Portugal, 2008. 8 pages.
Silver et al., "Unified Network Presence Management," White Paper Nortel Networks, 2000, 6 pages.
Anonymous, "3GPP; Technical Specification Group Services and System Aspects; Presence Service; Architecture and Functional Description," 3GPP TS 23.141 V6.0.0, Oct. 2002, 31 pages.
Livingston et al., "Remote Authentication Dial in User Service (RADIUS)," Radius Working Group, Internet-Draft, Feb. 2000, 80 pages.
Droms, "Dynamic Host Configuration Protocol," Oct. 2003, available from http://www.ietf.org/rfc/rfc1541.txt, 40 pages.
Nokia "Parameters in Subscriber Certificate and Subscriber Profile Supporting Operator Control and Service Differentiation", 4pp., 3GPP TSG SA WG 3 Security, Feb. 25-28, 2003, Sophia Antipolis, France.
Dr. Bert Dempsey and Dr. Matthew Lucas, "IPDR Update: Standards Effort Moves From Usage to Provisioning", pp. 44-48, TelOSSource Magazine, Apr. 2000.
Sun Microsystems, Chapter 8, Authentication Options, Sun Java System Access Manager 6 2005QI Adminstration Guide, Sun Microsystems, pp. 1-25, Mar. 2005.
Opencon, "White Paper on Billing for the New Public Network", pp. 1-5, OpenCon Systems, Inc., www.opencon.com, 2000.
The Parlay Group, Inc., The Parlay Group: Web Services Working Group, "Parlay Web Services Application Deployment Infrastructure", pp. 1-21, Version 1.0, Oct. 31, 2002.

(56) References Cited

OTHER PUBLICATIONS

Michel L.F. Grech et al., "Delivering Searmless Services in Open Networks Using Intelligent Service Mediation", pp. 186-202, Bell Labs Technical Journal, Jul.-Sep. 2000.

Anokhin, P. and Motro, A., "Fusionplex: Resolution of Data Inconsistencies in the Integration of Heterogeneous Information Sources," Jan. 20, 2004, pp. 1-31; XP002392285.

Berendt, B., Hotho, A. Mladenic, D., van Someren, M., Spillopoulou, M., & Stunune, G. (2004). A Roadmap for Web Mining: From Web to Semantic Web.

Gertz, M., "Managing Data Quality and Integrity in Federated Databases," 2nd Annual IPIP TC-11 WGII.5 Working Conference on Integrity and Internal Control in Information Systems, Nov. 1998, pp. 1-19; © IFIP 1996; Published by Chapman & Hall; XP002392339.

"European Search report on EP application No. 13001132.3", European Patent Office, dated Oct. 4, 2013.

Kellogg, R,B., Subhas, M., ""Text to hypertext: Can Clustering Solve the Problem in Digital Libraries?"" Proceedings of 1st ACM InternationalConference on Digital Libraries, Mar. 20, 1996, pp. 144-150.

Social Media Analysis Software-CRM Software-SAP—Make Social Media Platforms an Asset to Your Organization With Our Social Media Analysis Software—http://www54.sap.com/lob/customer-service/software/social-media-analytics/index.html, dated Jan. 22, 2013, (1 p).

* cited by examiner

COMMUNICATION COLLABORATION

PRIORITY

This application is a Continuation of commonly assigned and pending U.S. patent application Ser. No. 13/789,270, filed Mar. 7, 2013, and entitled "Communication Collaboration", which claims priority to U.S. Provisional Patent Application Ser. No. 61/607,870, filed Mar. 7, 2012, which are incorporated by reference in their entireties.

INCORPORATION BY REFERENCE

U.S. Pat. No. 7,925,880 (application Ser. No. 11/313,441), Titled "Authentication and Authorization Architecture for an Access Gateway," U.S. Pat. No. 7,702,753 (application Ser. No. 11/313,463), Titled "Unified Directory and Presence System for Universal Access to Telecommunications Services," U.S. Pat. No. 7,551,925 (application Ser. No. 11/313,496), Titled "Unified Directory System Including a Data Model for Managing Access to Telecommunications Services," U.S. Pat. No. 7,920,583 (application Ser. No. 11/314,576), Titled "Message Sequencing and Data Translation Architecture for Telecommunication Services," U.S. Pat. No. 7,917,124 (application Ser. No. 11/314,577), Titled "Third Party Access Gateway for Telecommunications Services," and application Ser. No. 11/313,497, Titled "Service Broker Integration Layer for Supporting Telecommunication Client Service Requests," Ser. No. 11/399,780, Titled "Service Delivery Platform and Development of New Client Business Models," Ser. No. 11/400,249, Titled "Service Delivery Platform," Ser. No. 12/564,579, Titled "Service Delivery Platform Docking Station," Ser. No. 13/039,289, Titled "Electronic Process-Driven Collaboration System", and Ser. No. 13/039,291, Titled "Electronic Process-Driven Collaboration System," are commonly owned and related to the present application, and are incorporated by reference in their entireties.

BACKGROUND

Communication can involve various modes, such as, for example, voice, video, text, mobile short message service (SMS), instant messaging (IM) chat, etc. Such diverse modes of communication can be challenging to implement and manage, for example, at a scalable level in an enterprise environment.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
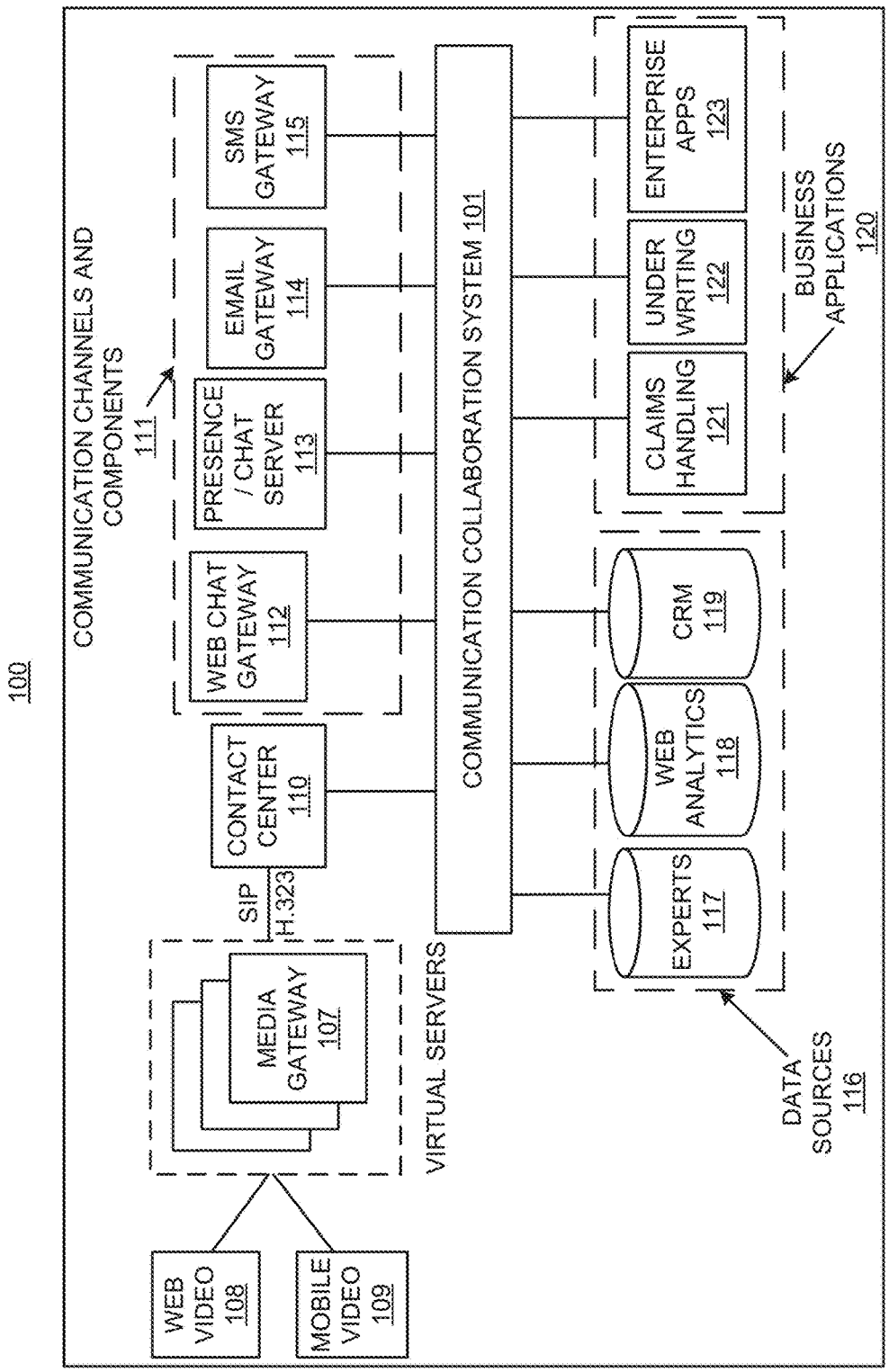
FIG. 1 illustrates an architecture of an environment including a communication collaboration system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A communication collaboration system and a method for communication collaboration are described herein and provide seamless integration of various modes of communication, for example, for supporting interactions between system users. The system users may include, for example, service providers (e.g., businesses), service subscribers (e.g., consumers), and other types of users. The various modes of communication may include, for example, voice, video, text, mobile SMS, IM chat, etc. System users may seamlessly communicate by a preferred mode of communication specific to each user. The system may integrate and orchestrate heterogeneous components (e.g., systems, platforms, applications) to create, execute, configure, activate, personalize, manage and monetize services in a way that is independent from distribution channels and from devices, delivering a consistent and homogeneous experience to final users. The system may thus provide for multi-channel synchronization of a variety of communication modes.

According to an example, the communication collaboration system may include a memory storing machine readable instructions to receive a first signal representing a first mode of communication for a user. The communication collaboration system may further include machine readable instructions to seamlessly escalate the first signal to a second signal representing a second mode of communication for the user. The second mode of communication may be different from the first mode of communication. The communication collaboration system may further include a processor to implement the machine readable instructions.

According to an example, the method for communication collaboration may include receiving a first signal representing a first mode of communication for a user, and seamlessly escalating, by a processor, the first signal to a second signal representing a second mode of communication for the user. The second mode of communication may be different from the first mode of communication.

The system may be used, for example, within a contact center to provide a multi-channel fully integrated contact center offering, or in an environment including a contact center. This may include the ability to monitor, orchestrate, route, transition and translate between a variety of modes of communication. In a business environment, customers may communicate with a business, for example, through room-based, mobile and web systems, thus providing for communication based on the desired mode of communication by all users of the system, for example, at the click of a button. The system may also manage the authentication, authorization and security of a communication session. Services related to the communication sessions may also be provided. For example, services, such as, recording and detailed reporting to assist in the monitoring of interactions may be provided.

The system may provide for fully scalable communication integration with a contact center. For example, the system may provide for fully scalable web-based video-to-contact-center integration. The system may provide for video call routing integration with internal screen pop and instant message clients. A system user may be seamlessly transferred across all channels of communication. For example, system users may initiate communication via video, chat or calling, and a communication may be seamlessly escalated to a different communication mode by identifying the modes of communication available at each endpoint and then systematically initiating a new communication channel. Escalating may include converting a signal from a first format to a second format, for example, by reducing a signal to a canonical format of data and contextual information. For example, bridging two video based systems may include separating signaling data from video content and passing the video content through a transcoder. Examples of the formats may include formats for voice, video, text, mobile SMS, IM chat, etc., which may each include a signaling channel and a content channel. Seamless escalation may include conversion without significant interruption, for example, by launching a new communication channel on both end points before modifying the original format. The ability to manage multiple video endpoints may also be provided for multi-party communication. For example, multiple video endpoints from a thick client video endpoint to a thin client web based video endpoint may be managed, for example, by a high performance transaction based database system that maintains definition data for each endpoint. The system may also provide resolution support systems for video agents. For example, the system may use expert back-channels to provide real-time advice as needed.

The system may provide a business entity with the ability to compete on customer service through collaboration. For example, for the insurance sector, given the over-commoditization of insurance business products, businesses may compete on customer service through collaboration in addition to product and cost. The scope of customer service collaboration may encompass every shared customer process. By improving communication, for example, among employees, customers, vendors and suppliers, the system may provide businesses with the ability to understand and respond to customer needs efficiently.

The system may also provide a business entity with the ability to deliver a differentiating experience. For example, the system may provide for social customer relationship management (CRM) by providing for the use of social media services, techniques and technology for engaging with customers. The system may provide for digital transformation to allow for the creation of operating models based on customer needs, for example, by creating a platform with defined Application Programming Interfaces (APIs) to build integrations directly into business applications.

The system may be physically implemented, for example, at a client datacenter, or may be implemented in a distributed computing environment, such as a cloud service, that may be linked to a client's environment. The system may thus provide a multi-tenant, multi-client solution for seamless collaboration of a variety of communication modes.

The communication collaboration system and the method for communication collaboration disclosed herein provide a technical solution to the technical problem of implementing and managing diverse modes of communication. In many instances, manual implementation and management of diverse modes of communication is not a viable solution given the heterogeneity and complexities associated with various modes of communication, such as, for example, voice, video, text, mobile SMS, IM chat, etc. The system and method described herein provide the technical solution of receiving a first signal representing a first mode of communication for a user, and seamlessly escalating, by a processor, the first signal to a second signal representing a second mode of communication for the user, with the second mode of communication being different from the first mode of communication. The system and method described herein further provide for receiving a plurality of different first signals, including the first signal, representing different first modes of communication for a plurality of users, and seamlessly escalating each of the plurality of different first signals to the second signal representing the second mode of communication for each of the plurality of users, with the second mode of communication being different from each of the first modes of communication. The first modes of communication may include at least two modes of communication selected from facsimile, voice, video, text, mobile short message service (SMS), multimedia messaging service (MMS), instant messaging (IM) chat, and email. The system and method described herein further provide for converting the first signal from a first format associated with the first mode of communication to a second format associated with the second mode of communication. Further, the system and method described herein further provide for translating the first signal to an intermediate canonical format, and seamlessly escalating the first signal translated to the intermediate canonical format to the second signal. Thus, the system and method described herein further provide efficiency in seamless escalation of a first signal to a second signal by translation of the first signal to an intermediate canonical format, and seamless escalation of the first signal translated to the intermediate canonical format to the second signal, by reducing a number of translations needed if a plurality of first signals are translated to a plurality of second signals. The system and method described herein further provide for seamlessly escalating the second signal representing the second mode of communication to a third signal representing a third mode of communication, with the third mode of communication being different from the first and second modes of communication.

FIG. 1 illustrates an architecture of an environment 100 including a communication collaboration system 101, according to an example of the present disclosure. The communication collaboration system 101 may also be referred to as a communication collaboration bus. The communication collaboration system 101 may also include a service delivery platform which is further shown in the detailed architecture of FIG. 2. FIGS. 3A-3E illustrate enlarged views of various modules and components of the system 101. For example, FIGS. 3A-3E illustrate enlarged views of core modules and components 102, access modules and components 103, application modules and components 104, network modules and components 105 and BSS/OSS modules and components 106.

As described herein, the modules and other components of the system 101 may comprise machine readable instructions stored on a non-transitory computer readable medium. In addition, or alternatively, the modules and other components of the system 101 may comprise hardware or a combination of machine readable instructions and hardware.

The general operation of the system 101 is described before proceeding with a further description of the various modules and components of the system 101.

Referring to FIG. 1, the environment 100 may generally include a media gateway 107 to manage various incoming communication channels. For example, the media gateway 107 may manage a web video channel 108 and mobile video channel 109. The environment 100 may include a contact center 110, which may include a call server (not shown) for routing calls. The media gateway 107 may be coupled to the contact center 110 for communication via the communication collaboration system 101. Communication channels and components 111 such as, for example, web chat gateway 112, presence/chat server 113, email gateway 114 and SMS gateway 115, may be provided for facilitating communication. Those skilled in the art will appreciate in view of this disclosure that other communication channels and components may be provided without departing from the scope of the invention. The web video channel 108, mobile video channel 109, and communication channels and components 111 may be coupled to user interfaces (not shown) for facilitating user communication based on a specific mode of communication. For example, a user of the system 101 may initiate a web video via a user interface, and the associated web video signal may be fed to the system 101 via the web video channel 108, which may be received by the media gateway 107 and the contact center 110. Data sources 116 such as, for example, experts 117, web analytics 118 and CRM 119 may be provided for storage and analysis of relevant data. The experts data source 117 may provide for storage and retrieval of data related, for example, to expert back-channels used to provide real-time advice as needed. The web analytics data source 118 may provide, for example, for the measurement, collection, analysis and reporting of Internet data. The CRM data source 119 may provide data related to customer interactions, for example, related to sales, service, etc. For an example of an insurance related business, business applications 120 such as claims handling 121, underwriting 122 and enterprise applications 123 may be provided. The system 101 may operate in conjunction with the components of the environment 100 to provide seamless integration of various modes of communication.

The modules and components 102-106 of the system 101 are described with reference to FIGS. 1-3E.

Figure 2:
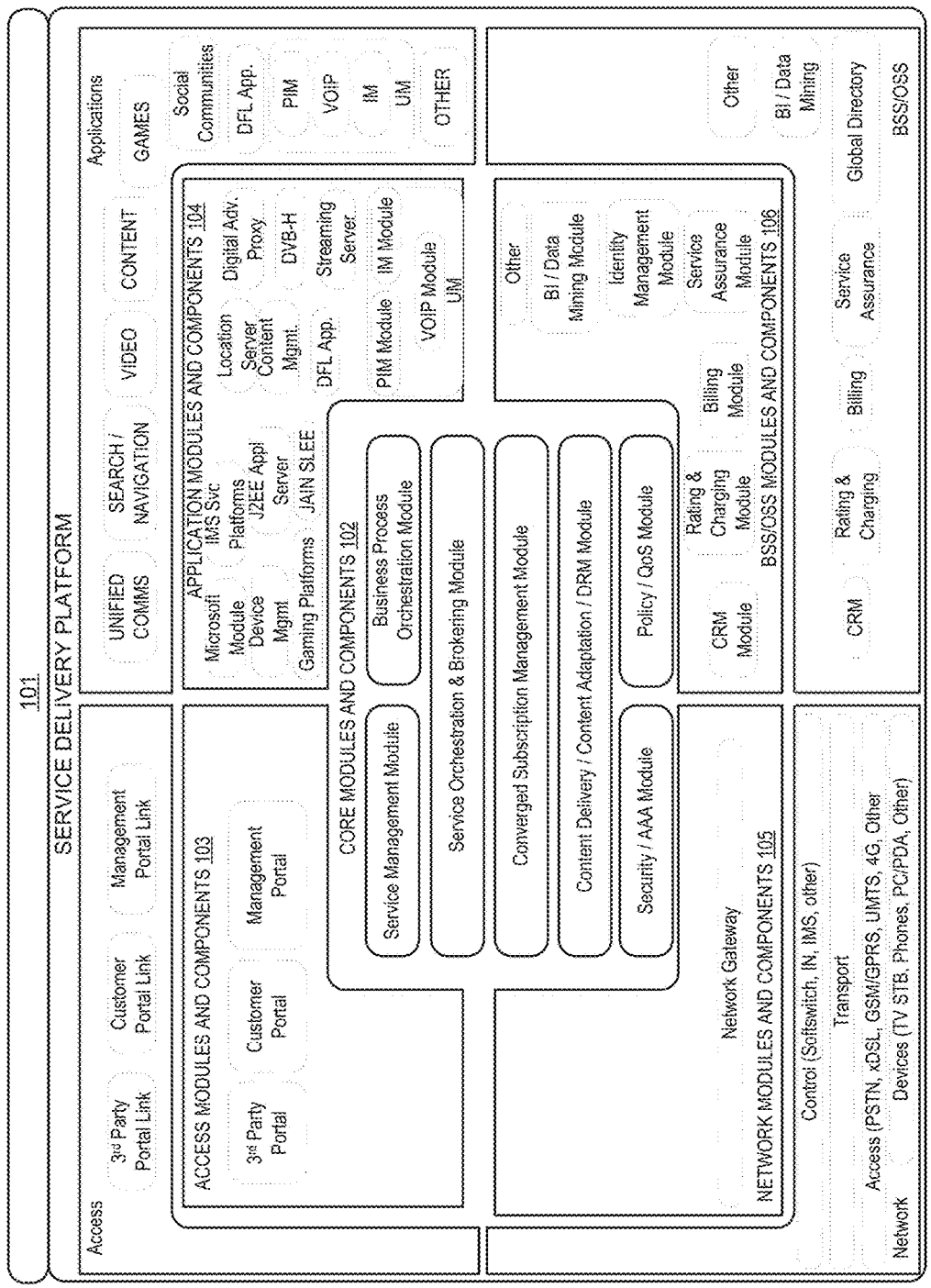
FIG. 2 illustrates a detailed architecture of the communication collaboration system of FIG. 1, according to an example of the present disclosure.
Figure 3A:
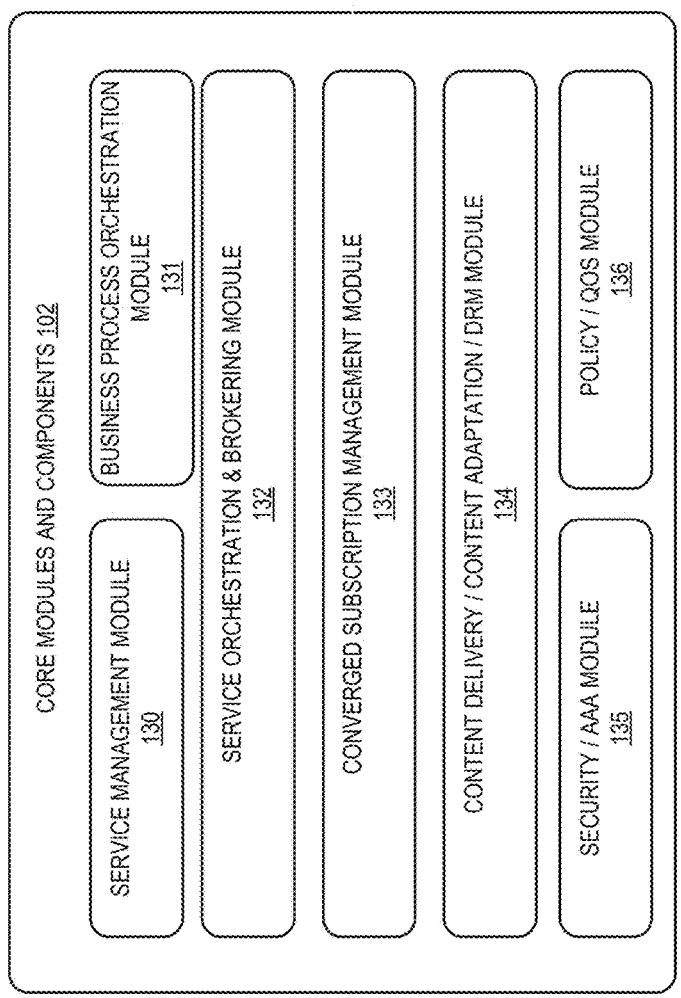
FIGS. 3A-3E illustrate enlarged views of core, access, application, network, and business support system (BSS) and operations support system (OSS) (i.e., BSS/OSS) modules and components of the communication collaboration system of FIG. 1, according to an example of the present disclosure.

Referring to FIGS. 2 and 3A, the core modules and components 102 may include a service management module 130, a business process orchestration module 131, a service orchestration and brokering module 132, a converged subscription management module 133, a content delivery, adaptation and digital rights management (DRM) module 134, a security, authentication, authorization and accounting (AAA) module 135, and a policy and quality of service (QoS) module 136. Examples related to components of FIGS. 2 and 3A-3E are disclosed, for example, in U.S. Pat. Nos. 7,925,880, 7,702,753, 7,551,925, 7,920,583, and 7,917,124, and in application Ser. Nos. 11/313,497, 11/399, 780, 11/400,249, 12/564,579, 13/039,289, and 13/039,291, which are incorporated by reference in their entireties.

The service management module 130 may provide a run-time environment for managing service development, and service exposure control.

The service management module 130 may define a set of programming interfaces and common standards that can be instantiated to connect to an external service and therefore operate as an abstraction layer for the external service. The other modules shown in FIGS. 3A-3E may invoke the service management module 130 when connecting to external services, such as web conferencing or SMS gateways.

The business process orchestration module 131 may provide stateful process orchestrations and business process modeling capabilities such as being a repository, for example, for a high performance insurance underwriting business process. The business process orchestration module 131 may contain data driven representation of processes, and may also maintain a state based awareness of each component of a process.

The service orchestration and brokering module 132 may provide blended services logic orchestrating events across network and service platforms, external platforms and systems (e.g. $3^{rd}$ party gateway (GW), portals, network elements, BSS/OSS). For example, different services may be automatically combined to obtain new functionalities. For example, since services may be defined by an abstracted common language, services may be readily connected together without significant effort (e.g., provisioning of phones upon adding new users into an active directory). The module 132 may also provide for management of flow logic, results aggregation, message transformation and routing among different application components and business rules enforcement. The module 132 may also function as a unified hub for integration of different systems and platforms, for example, by using the service management module 130.

The converged subscription management module 133 may provide aggregation of all the technical data needed to provision, activate, execute and operate value added services. The module 133 may provide an integrated device database (DB). The module 133 may function as a repository for information needed to configure, activate, execute and operate converged services. The module 133 may also function as a database for the system 101 and store and maintain the reference master of technical data needed for the execution of processes. The module 133 may include a business process management engine to set data and attributes needed to manage and control users, services and subscriptions, and retrieval of information. Replica of business data may be maintained for facilitating the configuration, activation, and execution of real-time converged services.

The content delivery, adaptation and DRM module 134 may provide integration with content management components. The module 134 may provide full administration of a content repository, dynamic and multi-type content delivery functionalities (e.g. adaptation, repurposing), as well as management of content rights both towards content providers and end users, for example, through digital rights management. The module 134 may further contain a database of content expiration information.

The security and AAA module 135 may provide common functions for network and services platforms to control user access and keep track, for example, for accounting purposes. The module 135 may protect the network and service resources and control customer access and experience. The module 135 may include an integrated console from which to set up users, external partners, devices, and set permissions. For example, in a business environment, an agent may set up new user profiles and/or update existing user profiles. For a business example, an administrator may also set up partner business entities. New devices (e.g., servers, computers etc.) may also be set up via the module 135. An administrator may also grant permission to users as to the scope of their interaction, for example, with a business entity via a web-based communication session.

The policy and QoS module 136 may provide both generalized and specialized policy decision points to manage service-level agreements (SLAs), QoS, etc., for example, by examining packet prioritization, packet loss, and bandwidth constrains on interconnected systems.

Figure 3B:
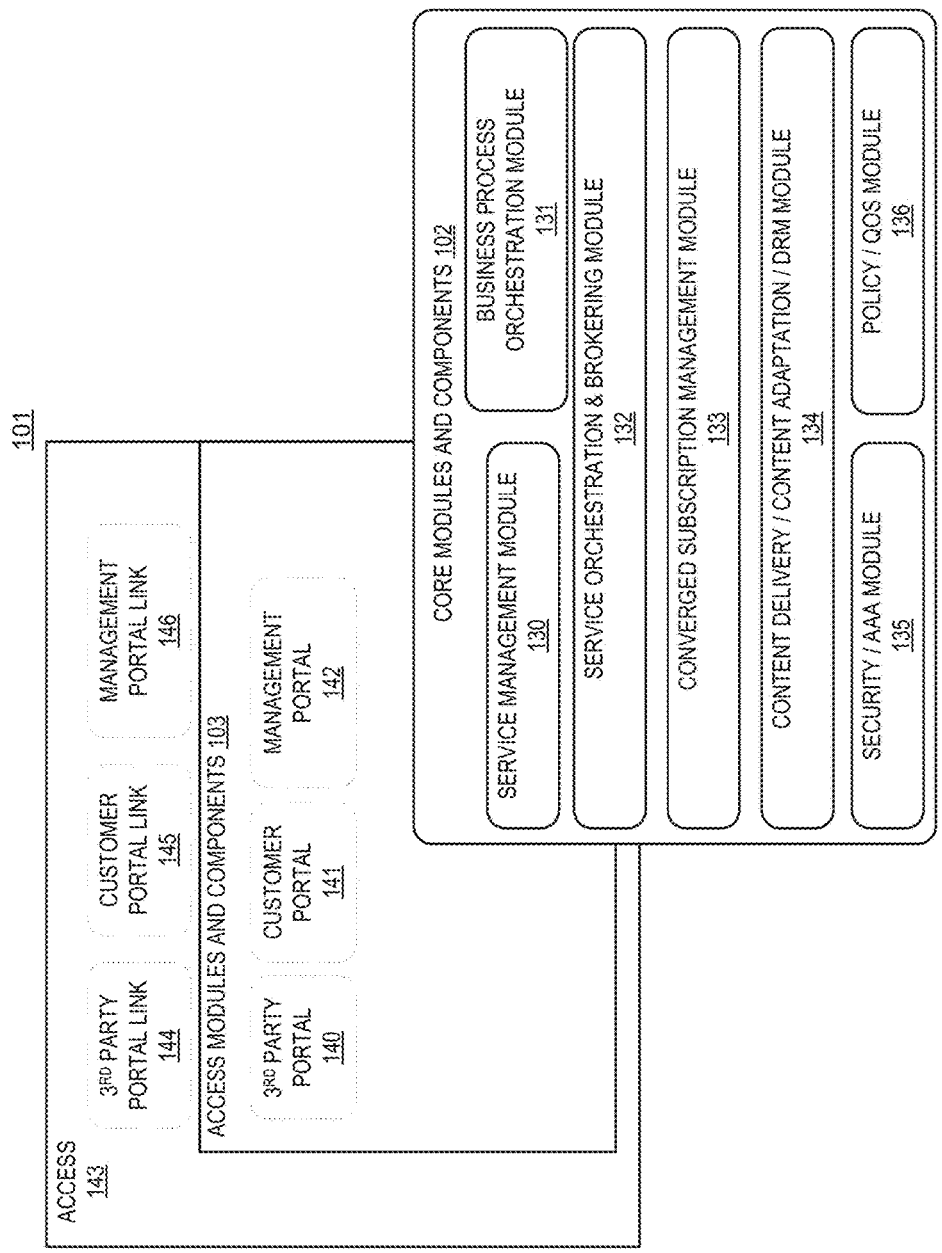

The core modules and components 102 are also shown in FIGS. 3B-3E to illustrate that the core modules and components 102 interact with the other modules and components of the system 101. Referring to FIGS. 2 and 3B, the access modules and components 103 may provide the user interfaces and dashboards needed for accessing available applications and functionality, and allowing user interaction with the system 101. The access modules and components 103 may facilitate operation of various portals for access to the features of the system 101. For example, the access modules and components 103 may facilitate operation of a $3^{rd}$ party portal 140, a customer portal 141 and a management portal 142. The modules and components 140-142 may be accessed at the access interface 143 through a $3^{rd}$ party portal link 144, a customer portal link 145 and a management portal link 146. Other portals and links may be provided based on the specific configuration of the system 101.

Figure 3C:
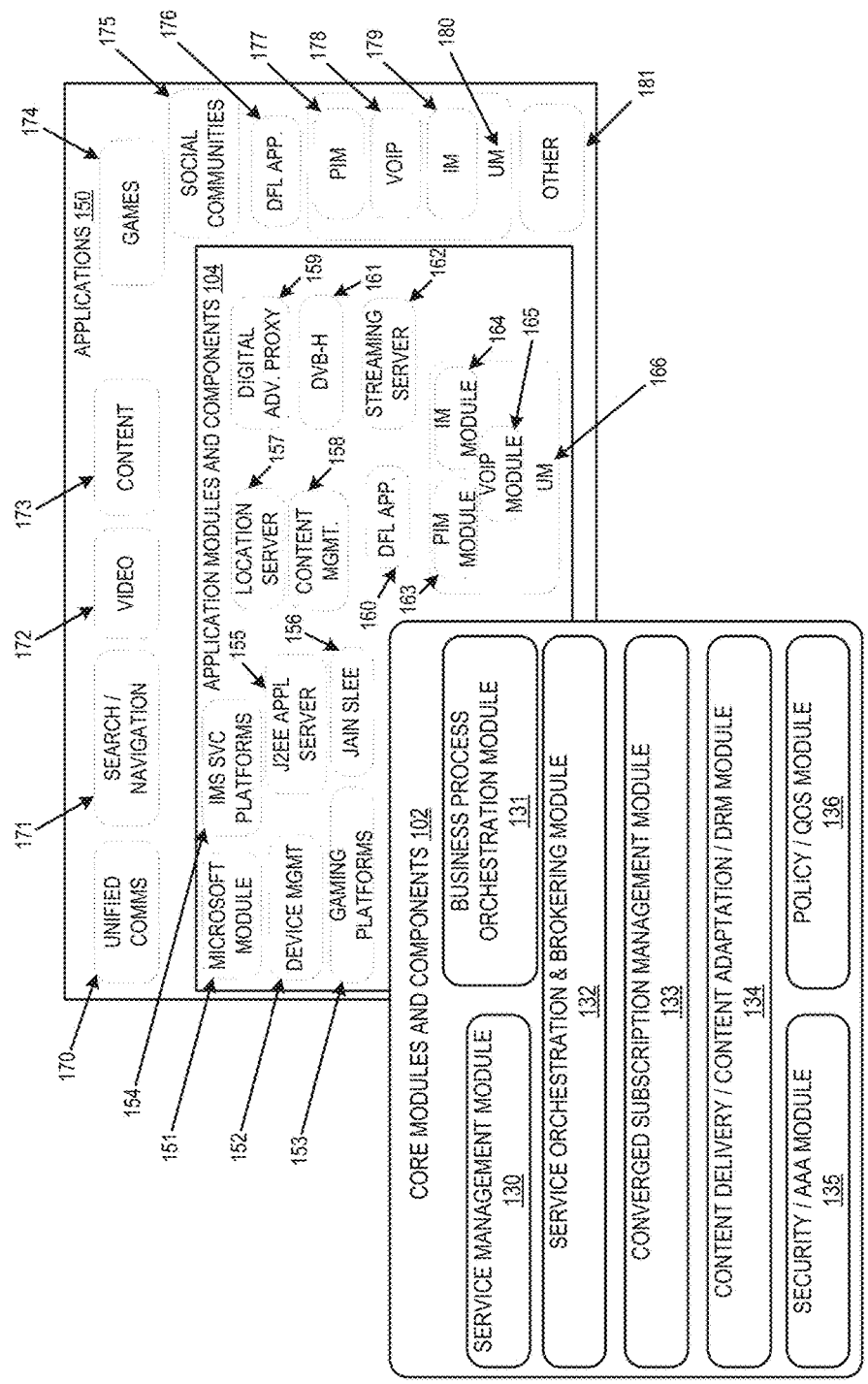

Referring to FIGS. 2 and 3C, the application modules and components 104 may provide programmable service platforms as well as vertical service platforms whose service logic can be used to build composite applications. The application modules and components 104 may facilitate operation of applications 150 of the system 101. For example, the application modules and components 104 may facilitate operation of a MICROSOFT module 151, a device management module 152, gaming platforms 153, IP multimedia subsystem (IMS) service platforms 154, a Java 2 platform, Enterprise Edition (J2EE) application server 155, a JAIN service logic execution environment (JAIN SLEE) module 156, a location server 157, a content management module 158, a digital advanced proxy module 159, a D-forms library (DFL) application module 160, a digital video broadcasting-handheld (DVB-H) module 161, a streaming server 162, a personal information management (PIM) module 163, an instant messaging (IM) module 164, and a voice over IP (VoIP) module 165. The PIM module 163, IM module 164, and VoIP module 165 may be part of a unified messaging (UM) module 166. The modules and components 151-166 may facilitate operation of the various applications 150. For example, the applications 150 may include a unified communications (UC) application 170, a search/navigation application 171, a video application 172, a content application 173, gaming applications 174, social community applications 175, a DFL application 176, a PIM application 177, a VoIP application 178 and an IM application 179. The PIM application 177, VoIP application 178 and IM application 179 may be part of a UM application 180. Other applications at 181 may include applications for recording, archival and retention of a communication session, and applications for providing communication-on-hold custom advertising and self-help, QoS guarantees for a communication mode, automated agent coaching, intelligent linking of experts via different communication modes, intelligent linking of information via different communication modes, monitoring of inappropriate interactions, workforce optimization services, service analytics, and physical and virtual augmentation services.

Figure 3D:
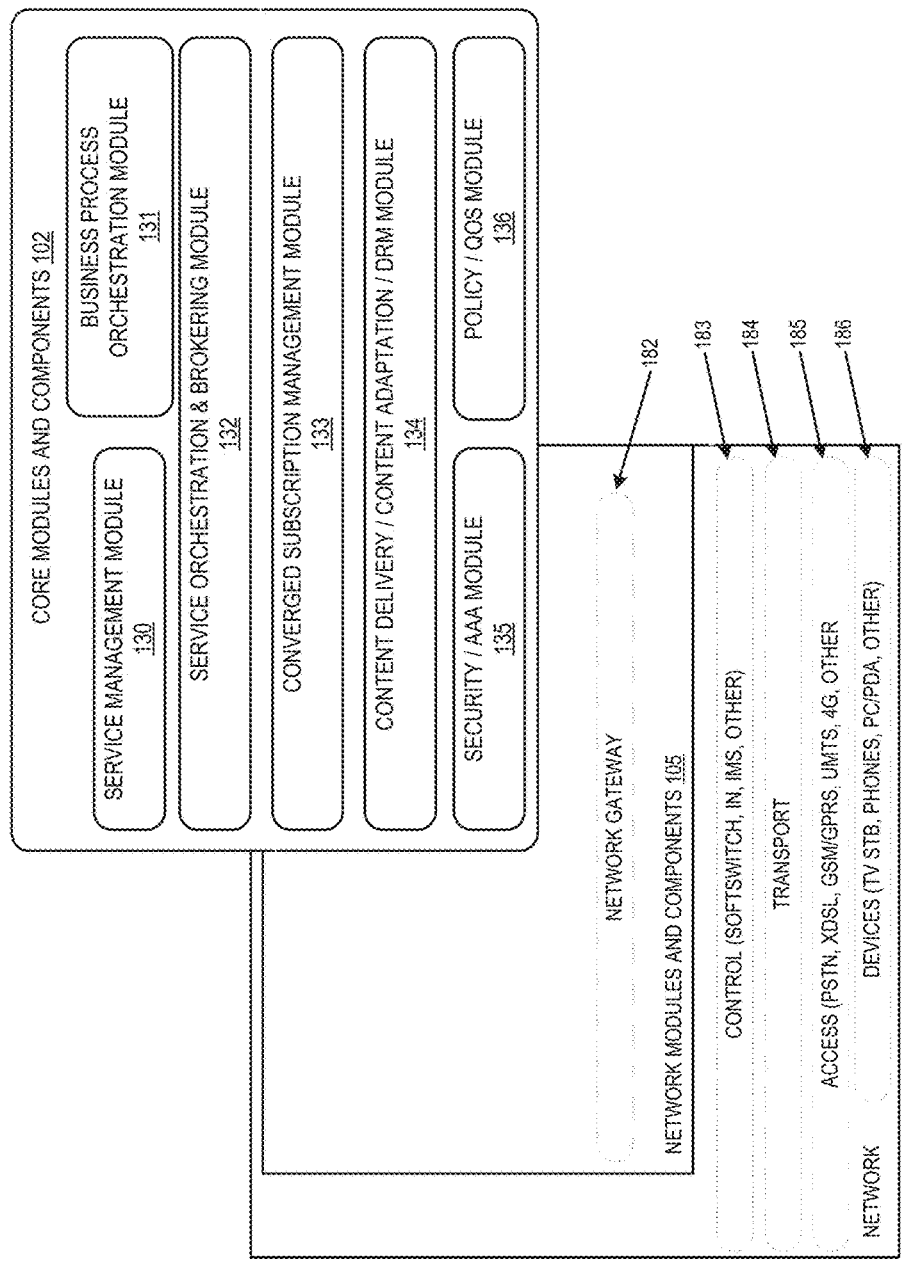

Referring to FIGS. 2 and 3D, the network modules and components 105 may provide the abstractions and integrations with underlying network and services platforms. The network modules and components 105 may also provide message transformations. The network modules and components 105 may include a network gateway 182 for providing control at 183, transport at 184 and access at 185 to and from the system 101 to various network devices 186. For example, control may be provided by a softswitch which connects telephone calls from one phone line to another, and an IMS. Access to and from the system 101 may be provided, for example, by a public switched telephone network (PSTN), a digital subscriber line (xDSL), global system for mobile (GSM) communication, general packet radio service (GPRS), universal mobile telecommunications system (UMTS), 4G etc. The system 101 may support various network devices, such as, for example, a television set top box (TV STB), phones, personal computers (PCs), personal digital assistants (PDAs) etc.

Figure 3E:
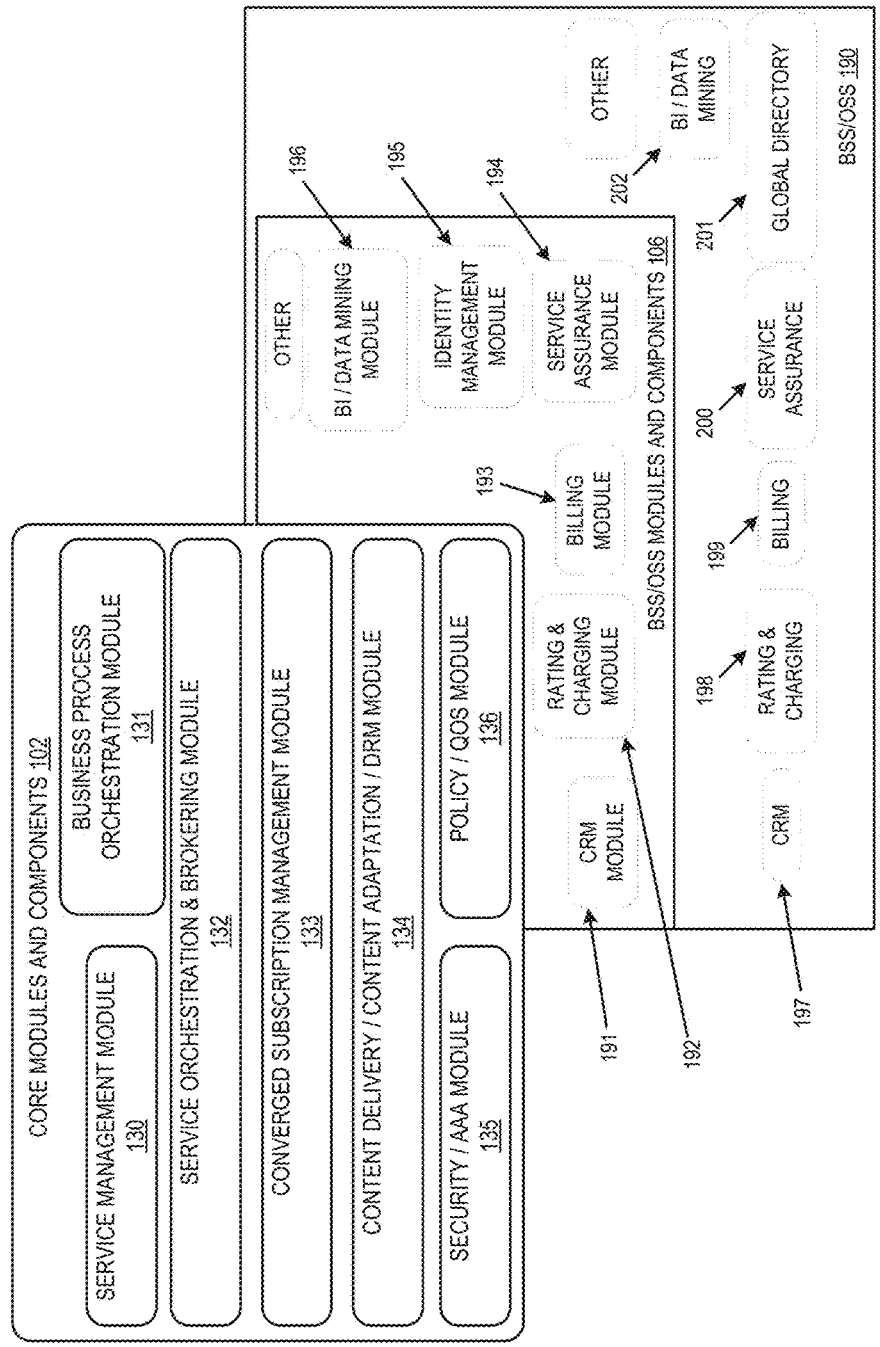

Referring to FIGS. 2 and 3E, the BSS/OSS modules and components 106 may provide high-level bridging with enterprise systems such as BSS/OSS, CRM, etc. The BSS/OSS modules and components 106 may include various modules and components for facilitating the BSS/OSS functions at 190. For example, the BSS/OSS modules and components 106 may include a CRM module 191, a rating and charging module 192, a billing module 193, a service assurance module 194, an identity management module 195 and a business intelligence (BI)/data mining module 196. The modules and components may provide BSS/OSS functions 190, such as, for example, CRM at 197, rating and charging at 198, billing at 199, service assurance at 200, a global directory at 201 and BI/data mining at 202.

The modules and components 103-106 may generally provide an integration gateway for abstraction and integration of platforms and applications exposing as services. The modules and components 103-106 may include provisioning, testing and certification processes and tools for on-boarding, testing, and certification of new applications. Device integration may be provided to facilitate provisioning and control of end user experience, for example, through customization and personalization based on knowledge of the capabilities of user devices. A softpanel may provide for a common user interface for interacting with and managing services. Further, a content management platform may provide for the provisioning and management of content.

As described in further detail below, the modules and components 102-106 may also provide functionality, such as, for example, orchestration, translation, routing, integration, an integrated device DB, administration, authentication, monitoring, logging, reporting, scaling, session control, recording, archival and retention of a communication session, communication-on-hold custom advertising and self-help, QoS guarantees for a communication mode, automated agent coaching, intelligent linking of experts via different communication modes, intelligent linking of information via different communication modes, monitoring of inappropriate interactions, workforce optimization services, service analytics, and physical and virtual augmentation services.

With regard to orchestration, the business process orchestration module 131 and the service orchestration and brokering module 132 may provide for seamless transfer of a communication stream between different entities. For example, in a business environment, a video stream may be seamlessly transferred during contact center agent handoffs and escalations, for example, by transferring video content, signaling, and customer related data. Seamless transfer may refer to a transition without a customer having to repeat identifying information, and further, all of the relevant media streams, history, etc., may be provided to a receiving agent. For example, a customer may contact a contact center by launching a video session. Communication during the video session may include video and audio streams. During, for example, handoffs or escalations, the video and audio streams may be seamlessly transferred to the appropriate agent. Likewise, if a customer were to contact a contact center by phone to initiate a voice session, communication during the voice session may include an audio stream. During, for example, handoffs or escalations, if the customer prefers a video session, a video session may be initiated and the video and audio streams may be seamlessly transferred to the appropriate agent. Thus, the initial audio stream may be seamlessly merged with the audio stream associated with a video session if the customer prefers a video session, for example, by transcoding and merging the audio stream into the video session in real time.

With regard to translation, the service orchestration and brokering module 132 and the content delivery, adaptation and DRM module 134 may provide message translation by providing a canonical format for communication of different communication formats. For example, the modules 132 and 134 may provide different message and video stream formats with a canonical format to communicate. For example, communication formats such as SKYPE, FACETIME, LYNC, WEBEX etc., may communicate seamlessly with mobile short message service (SMS), instant messaging (IM) chat or click to text communication formats, for example, by reduction of a message to a canonical format and then translation into a preferred format. For example, a customer initiating a communication session via FACETIME may seamlessly communicate with a business using a LYNC communication format. In this regard, the FACETIME and LYNC communication formats may be translated to an intermediate canonical format for seamless communication. Moreover, a variety of communication channels may be seamlessly integrated and translated. For example, various video channels may be seamlessly integrated and translated for a communication session.

With regard to routing, the business process orchestration module 131 may provide for use of a common set of rules to route customers, regardless of the type of communication. For example, regardless of whether a communication is based, for example, on voice, text or video, one set of rules may be used to route customers using any of the foregoing types of communication formats. For example, for a business setting, a customer initiating a voice session may be routed to an agent using a rule governing transfer to agents, for example, by running a set of business rules and using the modules and components 103-106 to control the various internal and external routing engines. Likewise, a customer initiating a video session may be routed to an agent using the same rule governing transfer to agents, regardless of the type of communication method. Such routing for different communication modes may also include translation of the modes of communication. Use of a common set of rules for routing may thus provide a consistent customer experience, where regardless of the mode of communication, a customer is routed to the same end destination.

With regard to integration, the service management module 130 and the service orchestration and brokering module 132 may account for multiple factors to make collaboration routing decisions. For example, the modules 130 and 132 may account for user device preferences, user presence, the status of a user with an entity etc. For example, for a business setting, a customer calling for the first time may be routed to a different agent compared to a repeat customer. The modules 130 and 132 may also provide for specific agent screen pop, for example, by providing real-time presence and seamless integration with IM clients. The modules 130 and 132 may also provide for management of multiple video endpoints, for example, by deployment of multi-chat processes and incentives along with presence integration for each communication channel, for example, by using the service management module 130 as an interface to video endpoints and the service orchestration and brokering module 132 to manage communications and presence integration.

Figure 4:
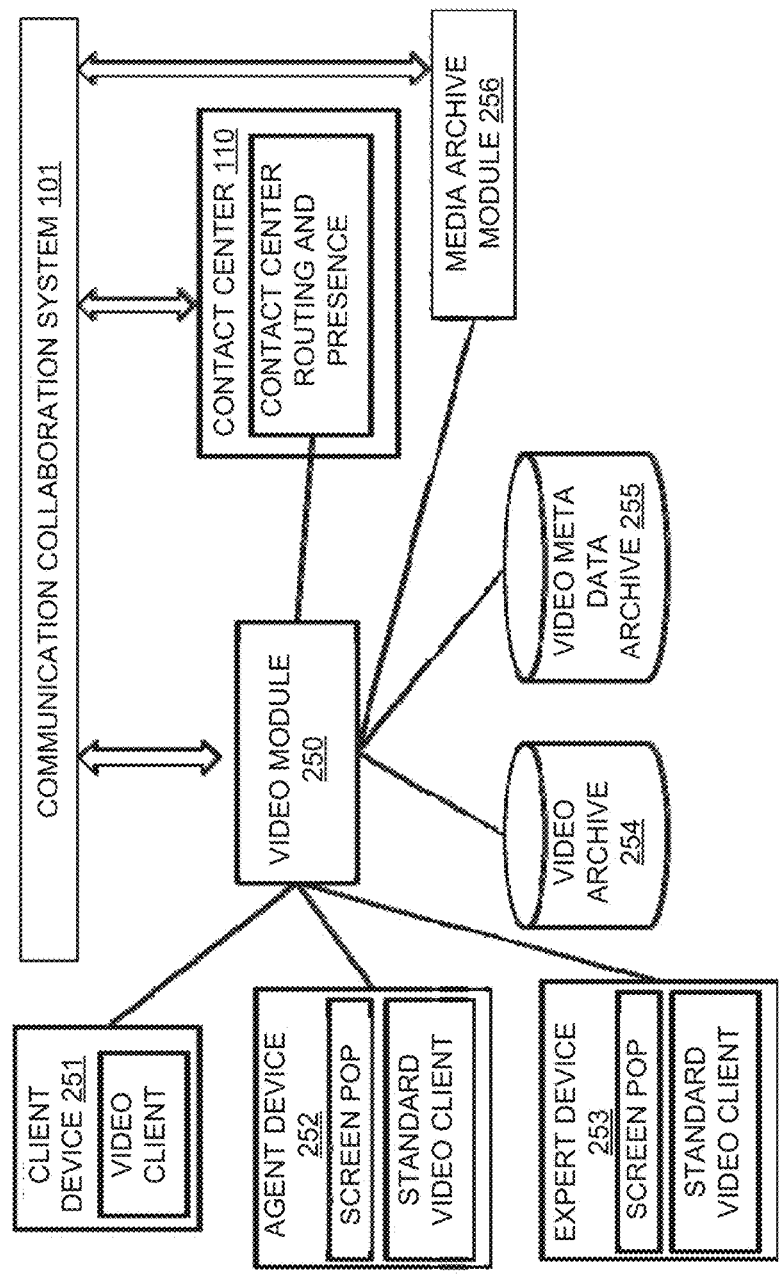
FIG. 4 illustrates components for multi-channel video integration and switching, according to an example of the present disclosure.

FIG. 4 illustrates components for multi-channel video integration and switching, according to an example of the present disclosure. As discussed above, the modules 130 and 132 of the system 101 may provide multi-channel communication integration and switching. For a specific example of multi-channel video integration and switching, the system 101 may include, or as shown in FIG. 4, be in communication with a video module 250. The video module 250 may operate in conjunction with the modules 130 and 132. The video module 250 may be in communication with a client device 251, an agent device 252 and an expert device 253. The video module 250 may also be in communication with a video archive database 254, a video meta data archive database 255, the contact center 110 and a media archive module 256. For a business environment example, assuming a user (e.g., a client) initiates a video communication from the client device 251, if an agent at the agent device 252 transfers the client to another agent (e.g., an expert at the expert device 253), the system 101 may maintain the audio, video and client data sessions. The client may be placed on hold and the system 101 may use rules for the contact center 110 for routing to the expert device 253, while maintaining the audio, video and client data sessions. A contextual video and audio advertisement may be played during the transfer. For the transfer, the expert device 253 may receive a screen pop requesting the transfer, and upon acceptance, the system 101 may broker the reconnection of the audio, video and client data sessions.

Thus, with regard to integration, the communication collaboration system 101 may provide multi-channel communication integration and switching. For example, video call routing may be integrated across multiple channels, such as, for example, web video, mobile video, etc. Likewise, any type of communication routing may be integrated across multiple channels. Users may be seamlessly transferred across all channels, regardless of their entry point. Users may be engaged on their terms, at their preferred times and via their preferred methods. Further, multiple video endpoints may be managed. For example, the system 101 may provide for the management for video endpoints, such as, for example, a thick client video endpoint to a thin client web based video endpoint. Management for video endpoints may also include management of the configuration and address/reference information of the endpoints.

With regard to the integrated device DB, the converged subscription management module 133 may provide an integrated device DB that includes data for subscribers (e.g., customers, agents etc.), relationships to one another (e.g. delegated administration), devices and capabilities, and service configuration. For example, all data related to system users may be stored in the integrated device DB for facilitating communication collaboration. For a business example, data related to relationships may be used, for example, to route customers to appropriate agents. Further, data related to devices, capabilities and service configuration may be used, for example, for scaling.

With regard to authentication, the security and AAA module 135 and the policy and QoS module 136 may provide for a user-specific or global authentication regardless of the communication mode, channel or device. For example, for a web-based communication session, a user may be allowed to initiate a communication session upon authentication based on a user-specific user ID and password. Alternatively, an administrator may be provided with a global user ID and password for accessing various levels of the system 101.

With regard to monitoring, logging and reporting, the security and AAA module 135 and the policy and QoS module 136 may provide for tracking and logging of collaboration interaction flows as a composite across a variety of communication modes. For example, the modules 135 and 136 may provide for tracking and logging of collaboration interaction flows as a composite across voice, video, text etc., to facilitate analytics. The information gathered may be used, for example, for scaling purposes.

With regard to scaling, the modules 130-136 may collectively provide for coordination of resources for appropriate response times. For example, the modules 130-136 may provide for coordination of network resources, servers, end-users (e.g., responders). The modules 130-136 may also provide for scalability through the virtualization of a media gateway.

With regard to session control, the business process orchestration module 131, the service orchestration and brokering module 132, and the converged subscription management module 133 may provide for maintenance of session dialog as subscriber collaboration transitions across a variety of communication modes. For example, the modules 131-133 may provide for maintenance of session dialog as subscriber collaboration transitions across voice, text, video channels, agents and SME groups.

With regard to recording, archival and retention of a communication session, the service orchestration and brokering module 132 and the streaming server 162 may be used in conjunction with a video recording application for the recording and for transcription. For example, videos may be recorded, regardless of communication channels, based on pre-defined criteria, such as, for example, time and location. Communication sessions may be archived, for example, to meet regulatory or compliance requirements. For example, videos may be archived to meet regulatory or compliance requirements. Communication session recordings may be retained for future use, such as, for example, training, service analytics, etc.

Figure 5:
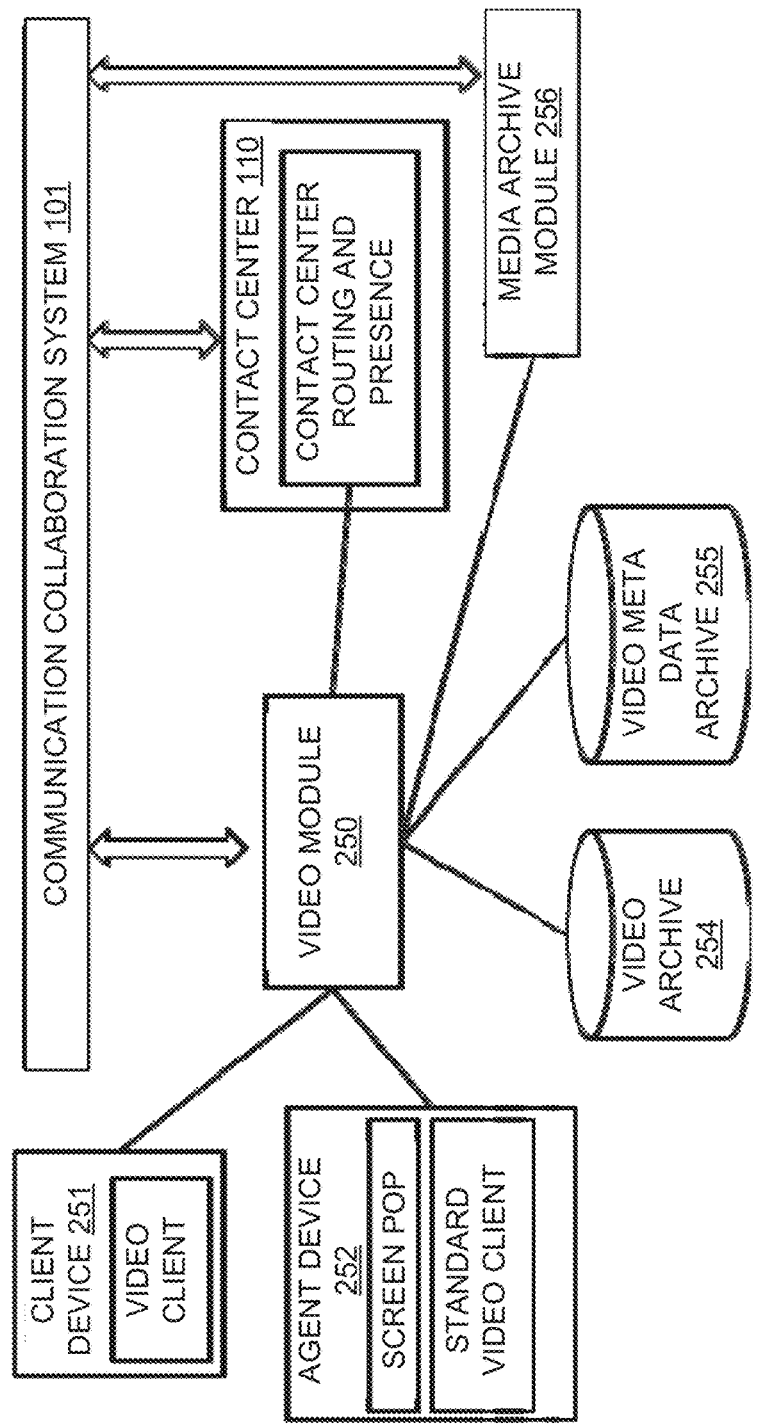
FIG. 5 illustrates components for video recording, archival and retention, according to an example of the present disclosure.

FIG. 5 illustrates components for video recording, archival and retention, according to an example of the present disclosure. As discussed above, the module 132 and the streaming server 162 of the system 101 may provide recording, archival and retention of a communication session. For a specific example of video recording, archival and retention, the system 101 may include, or as shown in FIG. 5, be in communication with the video module 250. As discussed with reference to FIG. 4, the video module 250 may operate in conjunction with the modules 130 and 132. The video module 250 may be in communication with the client device 251 and the agent device 252. The video module 250 may also be in communication with the video archive database 254, the video meta data archive database 255, the contact center 110 and the media archive module 256. For a business environment example, assuming a user (e.g., a client) initiates a video communication from the client device 251, the system 101 may use a client database to evaluate policy for the communication and current client context. The system 101 may use the contact center 110 for routing, and push a screen pop to the agent device 252. If the agent accepts the video communication, if needed, the system 101 may record the video communication session and store the recording in the video archive database 254. Additionally, video meta data may be recorded and stored in the video meta data archive database 255. Once the video communication is initiated, the system 101 may broker the client and agent connections to a media gateway (e.g., the media gateway 107 of FIG. 1). Upon completion of the video communication, the system 101 may update and record the video meta data with call details in the meta data archive database 255.

With regard to communication-on-hold custom advertising and self-help, a custom advertising application may be provided, for example, as an application in the applications 150 or as a module, and operated in conjunction with the modules and components 102-106. For example, a video may be stopped and played on-demand, and include custom advertising based on a user's interest. The CRM module 191 may link to a user's profile, and advertising may be selected based on the user profile, for example, by using specific information such as a user's current products, previous support requests, demographic data, or browsing history. Service catalogs may be seamlessly integrated based on a user's response to an advertisement.

With regard to QoS guarantees for a communication mode, a QoS guarantee application may be provided, for example, as an application in the applications 150 or as a module, and operated in conjunction with the modules and components 102-106. For example, QoS guarantees may be implemented by the policy and QoS module 136. For QoS guarantees, various audio, text or video service modes may include a QoS guarantee. This may allow users to maintain a predetermined level of QoS while switching across multiple channels, for example, by managing network communications and packet level information.

With regard to automated agent coaching, an agent coaching application may be provided, for example, as an application in the applications 150 or as a module, and operated in conjunction with the modules and components 102-106. For example, the agent coaching application may capture best practices and user feedback. These factors may be captured, for example, via a video media exchange. In a business environment, the agent coaching application may automate the creation of a training library for agents, for example, by prompting agents to record a brief video based on their latest interaction, and transcoding the voice to text to provide for intelligent searching and generation of the training library content. Agent training and coaching may be automated based on scenarios. The contents of the training library may also be frequently updated.

With regard to intelligent linking of experts via different communication modes, an expert linking application may be provided, for example, as an application in the applications 150 or as a module, and operated in conjunction with the modules and components 102-106. For example, the expert linking application may provide for intelligent linking of experts via video. For a business example, a user may be routed to the correct expert via video based on user's request. The expert linking application may also provide for seamless integration to an expert database, and with a presence feature that provides online and offline status of users. Users may also be seamlessly transferred among experts based on a user's interest.

With regard to intelligent linking of information via different communication modes, an information linking application may be provided, for example, as an application in the applications 150 or as a module, and operated in conjunction with the modules and components 102-106. For example, the information linking application may provide for intelligent linking of information via video. For example, the intelligent linking may be provided by utilizing a library of content for each mode of communication and evaluating a user's current needs based on contextual data and direct request. Users may be provided with the correct information based on a user's request, for example, via video. Information may also be seamlessly integrated with a product and/or services database. Information may be seamlessly integrated with marketing and advertising portals. A communication session may be escalated to a live expert based on a user's interest.

With regard to monitoring of inappropriate interactions, a monitoring application may be provided, for example, as an application in the applications 150 or as a module, and operated in conjunction with the modules and components 102-106. For example, monitoring and interception of inappropriate interactions may be used to improve user services. Monitoring and interception of inappropriate interactions may also be used to improve transparency and provide personalized services during user interactions. The monitoring application may also provide for tracking and log collaboration interaction flows as a composite across different communication modes. For example, the monitoring application may provide for tracking and log collaboration interaction flows as a composite across voice, video, text etc., to better provide for analytics.

With regard to workforce optimization services, a workforce optimization application may be provided, for example, as an application in the applications 150 or as a module, and operated in conjunction with the modules and components 102-106. For example, users may be routed to a correct level of resources at the correct time. Expert usage may be maximized by leveraging lower level resources to perform more basic functions. Agent time may be reduced via a variety of self service features. The speed of user information access may be increased via warm transfers among agents and experts.

With regard to service analytics, a service analytics application may be provided, for example, as an application in the applications 150 or as a module, and operated in conjunction with the modules and components 102-106. For example, users may be routed to the correct source at the correct time. The service analytics application may provide for improvement in the speed of access to user information. The service analytics application may also provide for improvement in understanding of user contacts and preferences. Metrics, key performance indicators (KPIs) and analytics may be used to provide insight on end-to-end user experience.

With regard to physical and virtual augmentation services, an augmentation services application may be provided, for example, as an application in the applications 150 or as a module, and operated in conjunction with the modules and components 102-106. For example, for users engaged in a video communication session, the augmentation services application may record all aspects related to whiteboard spaces, printing, signing of documents, and generally, any business related transaction. For example, all physical and virtual aspects of a communication may be integrated and recorded. The whiteboard capability may allow advisors, customers, and other process participants to execute whiteboard capabilities next to video. The augmentation services application may also provide video-based collaboration to thus provide a virtual video signature for any transaction. Video signature, video notarizing, and video identity authentication may be provided, for example, for the purpose of signature and verification of biometric sampling. Examples of biometric sampling may include electrocardiogram (EKG), urinalysis, blood analysis, etc. Further, users may review documents for a transaction via video, authenticate the documents and/or individuals subject to a transaction, record any agreements reached, and thus record all physical and virtual aspects of a communication. The augmentation services application may also provide for secure document download and remote wipe. Bring your own device (BYOD) integration may allow a user to bring their own device to an environment provided by the augmentation services application and operate the device as needed. Further, any communication, such as, for example, video-based communication, may include secure sharing and signing of documentation. The core modules and components 102, such as, for example, the modules 130-136 may be used to provide seamless collaboration of all different modes of communications used during such a transaction, for example, by abstracting the communication mode from the collaboration, which allows tasks such as document signing collaboration to work with both video and audio based communication modes without being aware of which mode is being used.

Referring to FIGS. 1, 2, 3A, 3C and 6, an example of a communication via the communication collaboration system 101 is described.

In order to initiate communication, a user of the system 101 may initiate communication via the customer portal link 144 (e.g., a web chat communication), for example, by clicking the link. The user may be presented with a variety of communication options 224 and a list of pre-selected individuals or entities the user may communicate with at 225. Once the link 144 is clicked, the access modules and components 103 may determine the type of click and based on the customer portal 141, the access capabilities of the user may be determined. Further, user preferences may be displayed at 226. The communication specifics, such as, for example, the parties involved in a communication session may be displayed at 227. The access capabilities may be determined by the service orchestration and brokering module 132 and the converged subscription management module 133. The service orchestration and brokering module 132 may also provide for management of flow logic, results aggregation, message transformation and routing among different application components and business rules enforcement, and function as a unified hub for integration of different systems/platforms. The converged subscription management module 133 may provide aggregation of all the technical data needed to provision, activate, execute and operate value added services.

Figure 6:
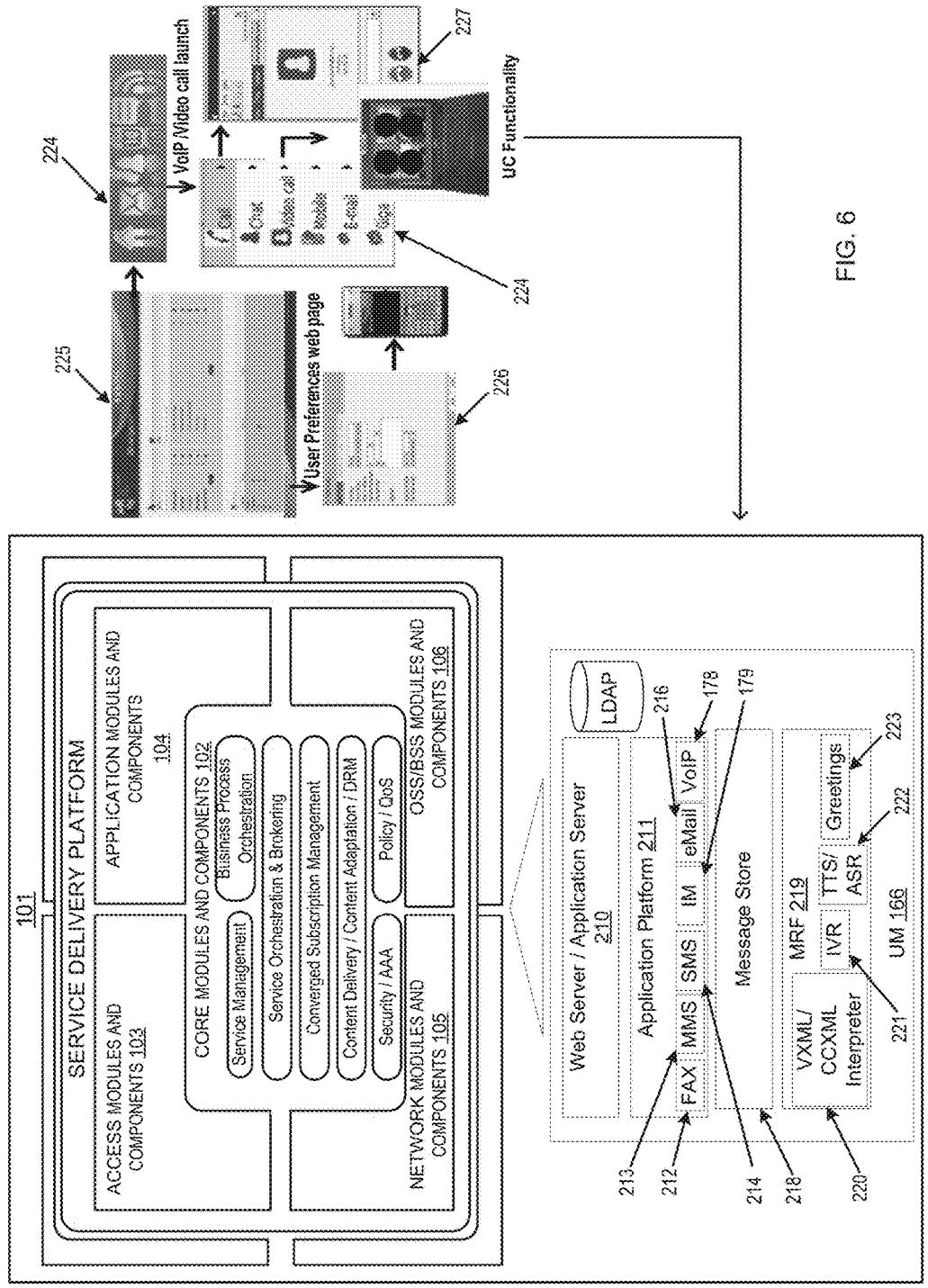
FIG. 6 illustrates communication via the communication collaboration system of FIG. 1, according to an example of the present disclosure.

Referring to FIG. 6, continuing with the foregoing example, a high level version of the system 101 and a further detailed version of the UM module 166 are illustrated. The UM module 166 may include access to a web/application server 210. The UM module may include an application platform 211 including facsimile 212, multimedia messaging service (MMS) 213, SMS 214, IM 179 (see FIG. 3C), email 216 and VoIP 178 (see FIG. 3C). The UM module 166 may include a message store 218, a message resource function (MRF) 219, a voiceXML (VXML) and call control eXtensible markup language (CCXML) interpreter 220, an interactive voice response (IVR) module 221, a text-to-speech (TTS) and automatic speech recognition (ASR) module 222, and a greetings module 223. For the foregoing example, assuming the user is requesting an invoice via e-mail, the email 216 may be used to send the invoice. Referring to FIGS. 3C and 6, the e-mail 216 may initiate or authorize the DFL application 176, the PIM application 177, the VoIP application 178 and the IM application 179. Assuming the user requests escalation to VoIP communication or the communication from the user is escalated to VoIP communication by an agent, the video application 172 and VoIP application 178 may be initiated or authorized. The service orchestration and brokering module 132 and the converged subscription management module 133 may use the VoIP module 165 to seamlessly escalate the original user e-mail communication to a VoIP communication, for example, by providing a link in an email that will instantiate a VOIP client and provide destination addressing information to create a call. In this manner, any communication mode may be seamlessly changed by the system 101 to a preferred mode of communication. For example, a communication mode may be seamlessly changed by providing communication modes with an interface layer that includes escalation, with each communication mode instantiating the escalation function based on the capabilities of the specific communication mode such as the endpoint client and the required connection information.

Figure 7:
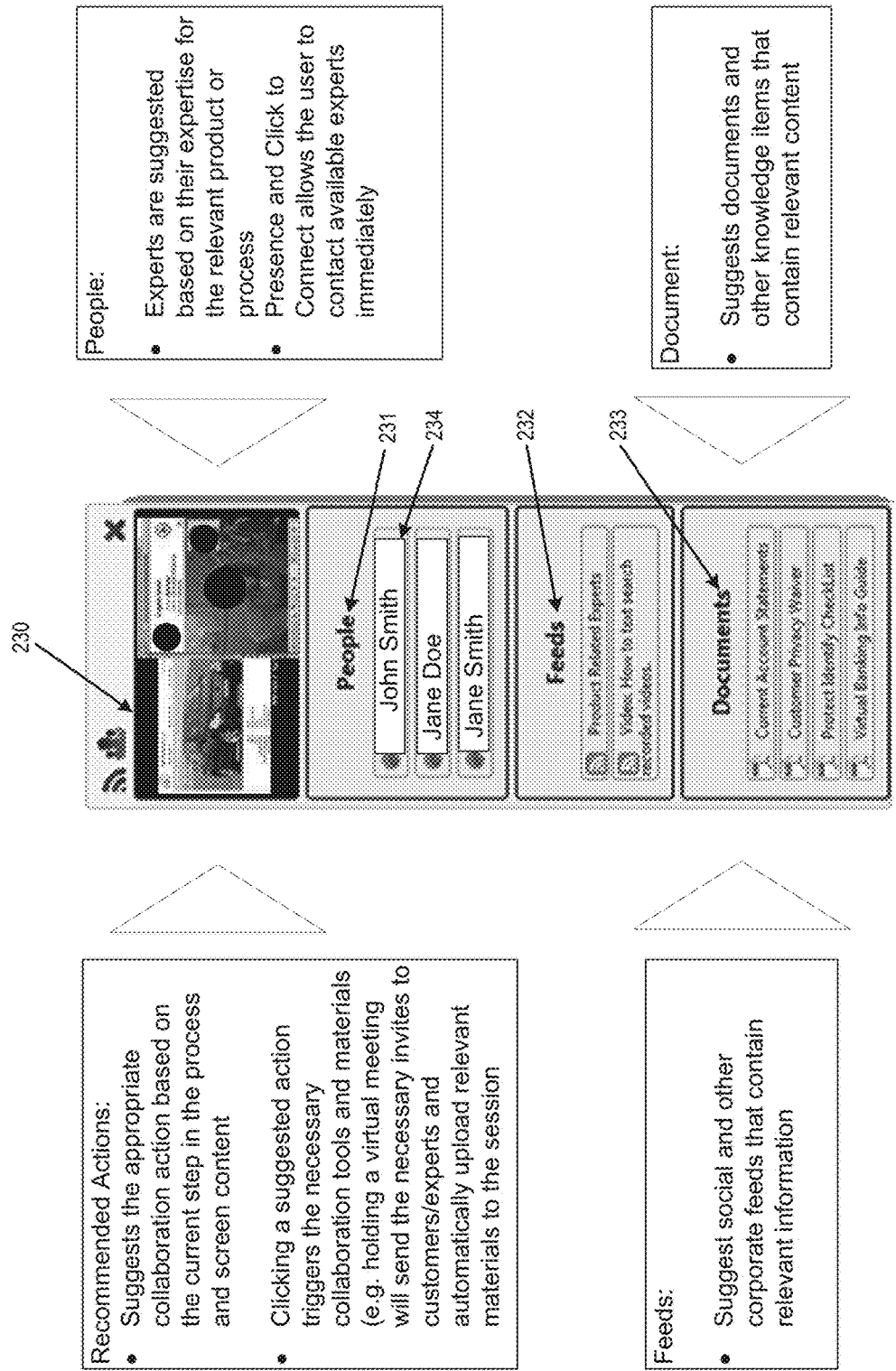
FIG. 7 illustrates an example of a display using the communication collaboration system of FIG. 1, according to an example of the present disclosure.

Referring to FIG. 7, an example of a display 230 using the communication collaboration system 101 is illustrated, according to an example of the present disclosure. The system 101 may embed, for example, presence, voice, video, conferencing, etc., inside a contact center agent's application. For example, the system 101 may recommend actions. For example, the system 101 may suggest the appropriate collaboration action based on the current step in the communication process and screen content. By clicking a suggested action, the appropriate collaboration tools and materials may be triggered. For example, holding a virtual meeting may send the necessary invites to customers/experts and automatically upload relevant materials to a session.

Still referring to FIG. 7, the system 101 may provide data related to people at 231, feeds at 232 and documents at 233. For example, for a business environment, for the people displayed at 231, experts may be suggested based on their expertise for a relevant product or process. Presence and click to connect options at 234 may allow a user to contact available experts immediately. For feeds displayed at 232, social and other corporate feeds that contain relevant information may be suggested. For documents displayed at 233, documents and other knowledge items that contain relevant content may be suggested.

Figure 8:
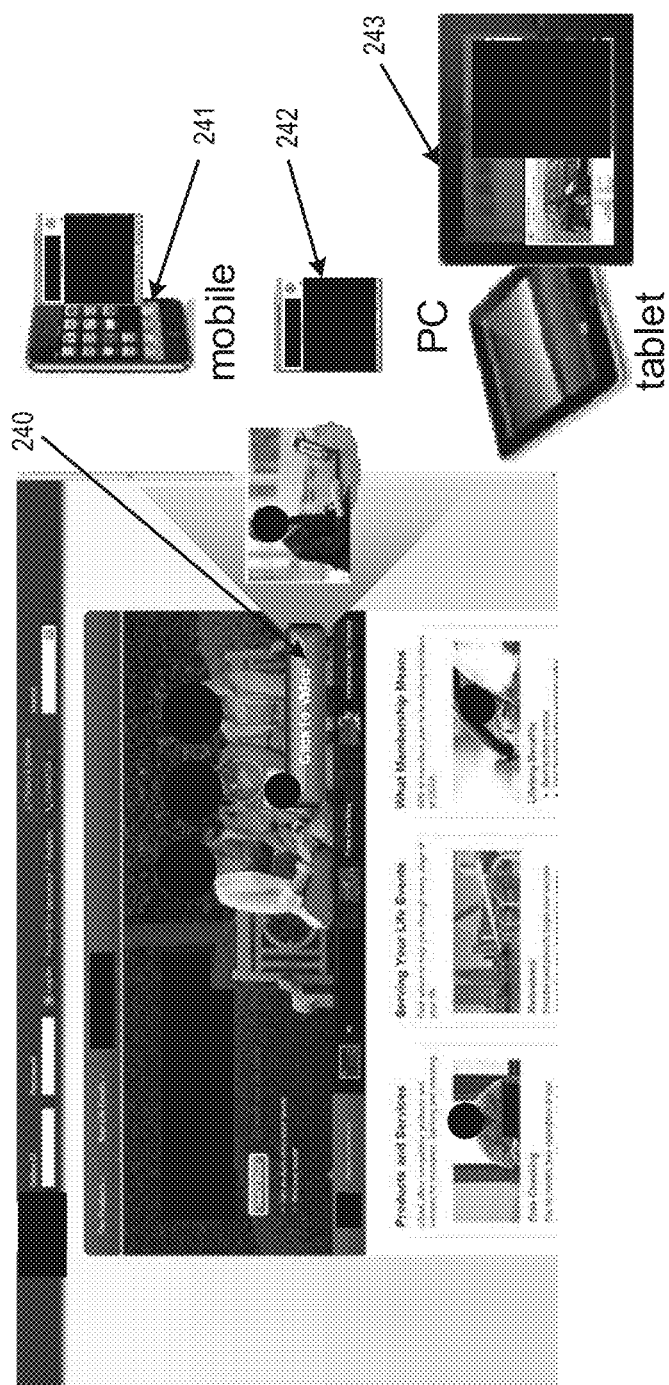
FIG. 8 illustrates a video application for the communication collaboration system of FIG. 1, according to an example of the present disclosure.

FIG. 8 illustrates a video application 240 for the communication collaboration system 101, according to an example of the present disclosure. Referring to FIGS. 3B and 8, for the video application 240, various communication devices, such as, for example, a phone 241, a personal computer (PC) 242 or a tablet 243 may be used for communication via the $3^{rd}$ party portal link 143, customer portal link 144 or the management portal link 145. Users of the system 101 may therefore communicate by a preferred mode of communication specific to the user, for example, by storing the preferred mode based on time, availability, and context as a preference that the system 101 may share with other users.

Figure 9:
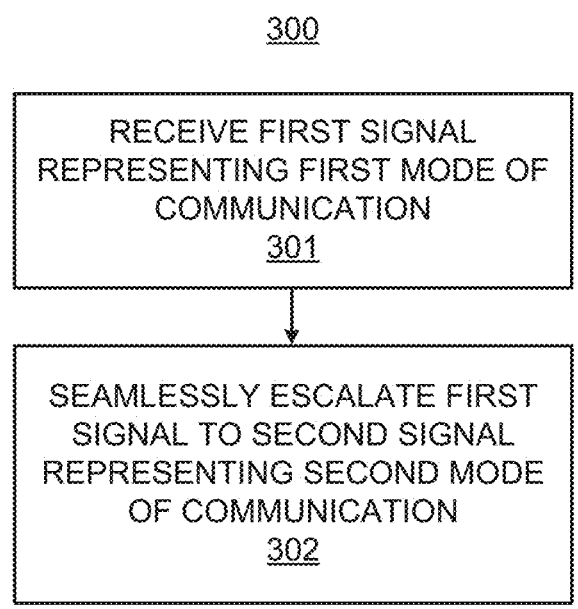
FIG. 9 illustrates a method for communication collaboration, according to an example of the present disclosure.
Figure 10:
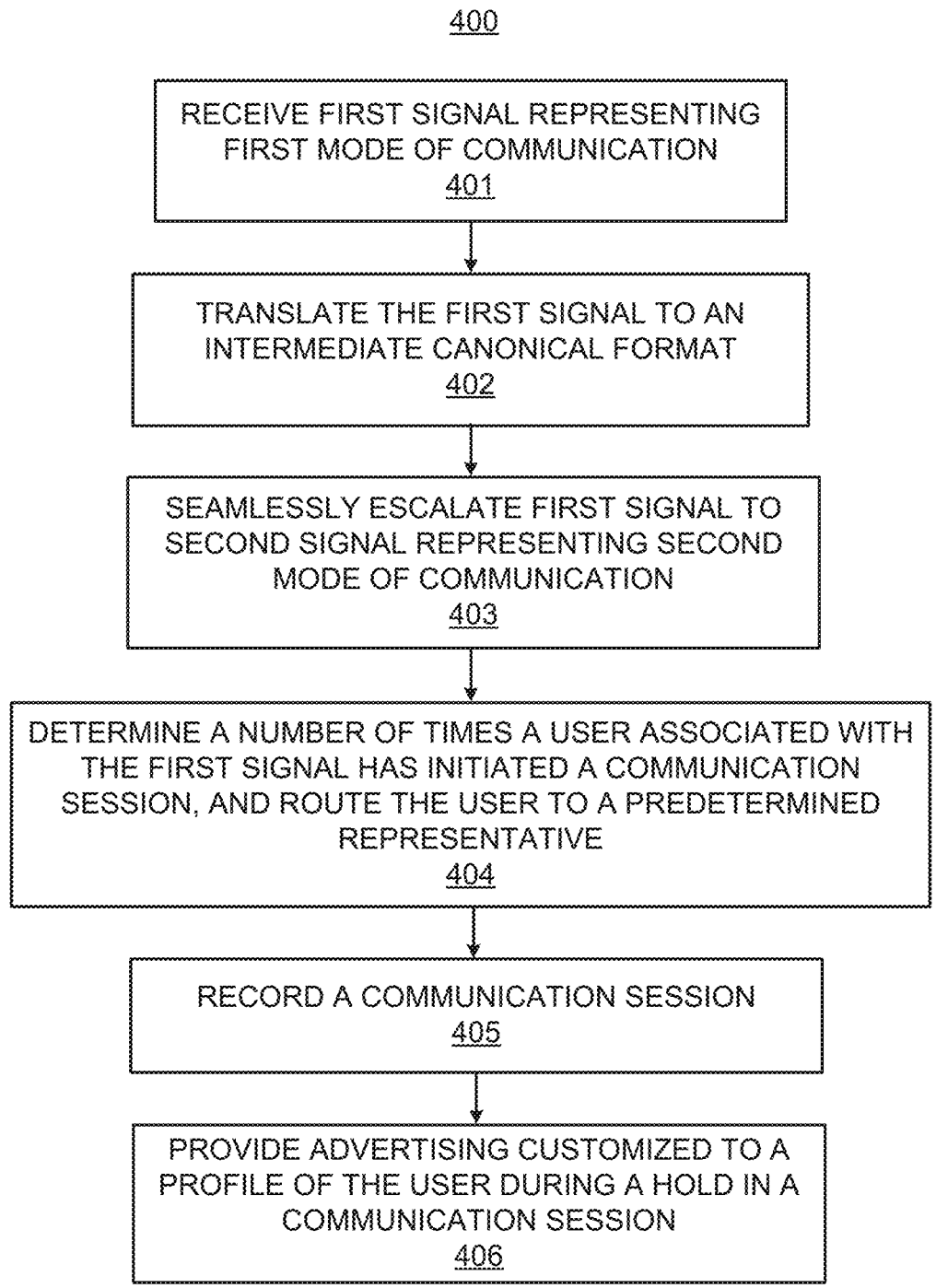
FIG. 10 illustrates further details of the method for communication collaboration, according to an example of the present disclosure.

FIGS. 9 and 10 respectively illustrate flowcharts of methods 300 and 400 for communication collaboration, according to examples. The methods 300 and 400 may be implemented on the communication collaboration system 101 described above with reference to FIGS. 2-8 by way of example and not limitation. The methods 300 and 400 may be practiced in other systems.

Referring to FIG. 9, at block 301, the method 300 may include receiving a first signal representing a first mode of communication for a user. For example, referring to FIG. 1, the communication collaboration system 101 is illustrated as being implemented with the contact center 110. The first mode of communication may include, for example, facsimile, voice, video, text, mobile SMS, MMS, IM chat, or email. For example, the system 101 may receive a first signal, such as, for example, a signal from the web video channel 108 representing web-based video mode of communication.

At block 302, the method 300 may include seamlessly escalating the first signal to a second signal representing a second mode of communication for the user. The second mode of communication may be different from the first mode of communication. For example, referring to FIGS. 1-3E, the business process orchestration module 131 and the service orchestration and brokering module 132 may provide for seamless transfer of a communication stream (i.e., signal) between different entities. For example, in a business environment, a video stream may be seamlessly transferred during contact center agent handoffs and escalations. For example, a customer may contact a contact center by launching a video session. Communication during the video session may include video and audio streams. During, for example, handoffs or escalations, the video and audio streams may be seamlessly transferred to the appropriate agent. Likewise, if a customer were to contact a contact center by phone to initiate a voice session, communication during the voice session may include an audio stream. During, for example, handoffs or escalations, if the customer prefers a video session, a video session may be initiated and the video and audio streams may be seamlessly transferred to the appropriate agent. Thus, the initial audio stream may be seamlessly merged with the audio stream associated with a video session if the customer prefers a video session.

Referring to FIG. 10, at block 401, the method 400 may include receiving a first signal representing a first mode of communication for a user. The method 400 may also include determining a first channel of communication from a plurality of first channels of communication associated with the first signal representing the first mode of communication. For example, referring to FIG. 1, the media gateway 107 may manage various incoming communication channels. The method 400 may also include receiving a plurality of different first signals, including the first signal, representing different first modes of communication for a plurality of users. For example, referring to FIG. 1, the media gateway 107 may manage a web video channel 108 and mobile video channel 109. Communication channels and components 111 such as, for example, web chat gateway 112, presence/chat server 113, email gateway 114 and SMS gateway 115, may be provided for facilitating communication. The first modes of communication may include at least two modes including facsimile, voice, video, text, mobile SMS, MMS, IM chat, and email.

At block 402, the method 400 may include translating the first signal to an intermediate canonical format. For example, the service orchestration and brokering module 132 and the content delivery, adaptation and DRM module 134 may provide message translation by providing a canonical format for communication of different communication formats.

At block 403, the method 400 may include seamlessly escalating the first signal to a second signal representing a second mode of communication for the user. The second mode of communication may be different from the first mode of communication. For example, the method 400 may include seamlessly escalating the first signal translated to the intermediate canonical format to the second signal. For example, the service orchestration and brokering module 132 and the content delivery, adaptation and DRM module 134 may provide different message and video stream formats with a canonical format to communicate. For example, communication formats such as SKYPE, FACETIME, LYNC, WEBEX etc., may communicate seamlessly with mobile SMS, IM chat or click to text communication formats. The method 400 may also include determining a second channel of communication from a plurality of second channels of communication associated with the second signal representing the second mode of communication, with seamlessly escalating the first signal to the second signal including seamlessly escalating the first signal associated with the first channel of communication to the second signal associated with the second channel of communication. Further, the method 400 may include seamlessly escalating each of the plurality of different first signals to the second signal representing the second mode of communication for each of the plurality of users, with the second mode of communication being different from each of the first modes of communication. Seamlessly escalating the first signal to the second signal may include converting the first signal from a first format associated with the first mode of communication to a second format associated with the second mode of communication. According to an example, if the first signal is an audio signal and the second signal includes video and audio signals, seamlessly escalating the first signal to the second signal may include seamlessly merging the audio signal associated with the first signal with the video and audio signals associated with the second signal. The second mode of communication may be selectable by the user. For example, referring to FIG. 6, the user may be presented with a variety of communication options 224 and a list of pre-selected individuals or entities the user may communicate with at 225. Further, the second mode of communication may be selectable based on a capability of a communication device used by the user for the first mode of communication. The method 400 may also include seamlessly escalating the second signal representing the second mode of communication to a third signal representing a third mode of communication, with the third mode of communication being different from the first and second modes of communication.

At block 404, the method 400 may include determining a number of times the user associated with the first signal has initiated a communication session, and routing the user to a predetermined representative of a plurality of representatives based on the determined number of times. For example, referring to FIG. 3A, the service management module 130 and the service orchestration and brokering module 132 may account for multiple factors to make collaboration routing decisions. For example, for a business setting, a customer calling for the first time may be routed to a different agent compared to a repeat customer.

At block 405, the method may include recording a communication session including the first signal representing the first mode of communication and the second signal representing the second mode of communication. For example, referring to FIGS. 3A and 3C, the service orchestration and brokering module 132 and the streaming server 162 may be used in conjunction with a video recording application for the recording and for transcription.

At block 406, the method may include providing advertising customized to a profile of the user during a hold in a communication session. For example, referring to FIG. 3E, the CRM module 191 may link to a user's profile, and advertising may be selected based on the user profile.

Figure 11:
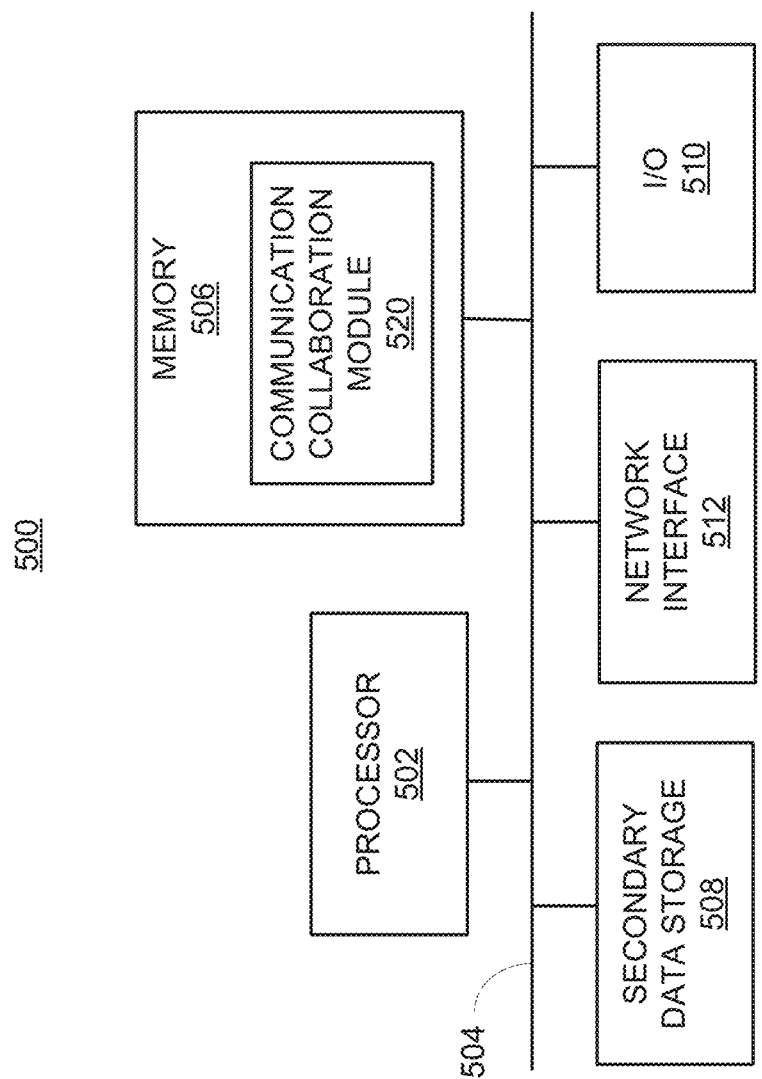
FIG. 11 illustrates a computer system, according to an example of the present disclosure.

FIG. 11 shows a computer system 500 that may be used with the examples described herein. The computer system 500 represents a generic platform that includes components that may be in a server or another computer system. The computer system 500 may be used as a platform for the system 101. The computer system 500 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 includes a processor 502 that may implement or execute machine readable instructions performing some or all of the methods, functions and other processes described herein. Commands and data from the processor 502 are communicated over a communication bus 504. The computer system 500 also includes a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums. The memory 506 may include a communication collaboration module 520 including machine readable instructions residing in the memory 506 during runtime and executed by the processor 502. The module 520 may include the modules of the system 101 shown in FIGS. 1-8.

The computer system 500 may include an I/O device 510, such as a keyboard, a mouse, a display, etc. The computer system 500 may include a network interface 512 for connecting to a network. Other known electronic components may be added or substituted in the computer system 500.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A communication collaboration system comprising:
a memory storing machine readable instructions to:
receive a plurality of different first signals representing different first modes of communication for a plurality of users, wherein a first signal of the plurality of different first signals is an audio signal;
seamlessly escalate each of the plurality of different first signals to a second signal representing a second mode of communication for each of the plurality of users while maintaining a communication session associated with the plurality of different first signals, wherein the second mode of communication is different from each of the first modes of communication, wherein the second signal includes video and audio signals, and wherein seamlessly escalating each of the plurality of different first signals to the second signal further comprises machine readable instructions to:
seamlessly merge the audio signal associated with the first signal with the video and audio signals associated with the second signal; and
launch, for the communication session including the first signal and the second signal representing the second mode of communication, a virtual meeting by
sending an invite to predetermined invitees,
suggesting social and corporate feeds that contain relevant information for the virtual meeting, and
automatically uploading, to a virtual meeting session, the relevant information for the virtual meeting; and
a processor to implement the machine readable instructions.

2. The communication collaboration system of claim 1, further comprising machine readable instructions to:
record a reproducible version of the communication session including the plurality of different first signals representing different first modes of communication and the second signal representing the second mode of communication.

3. The communication collaboration system of claim 1, further comprising machine readable instructions to:
determine a plurality of first channels of communication associated with the plurality of different first signals representing the different first modes of communication; and
determine a second channel of communication from a plurality of second channels of communication associated with the second signal representing the second mode of communication,
wherein seamlessly escalating each of the plurality of different first signals to the second signal comprises seamlessly escalating each of the plurality of different first signals associated with the plurality of first channels of communication to the second signal associated with the second channel of communication.

4. The communication collaboration system of claim 1, further comprising machine readable instructions to:
translate the first signal to an intermediate canonical format; and
seamlessly escalate the first signal translated to the intermediate canonical format to the second signal.

5. The communication collaboration system of claim 1, wherein the second mode of communication is selectable by a user.

6. The communication collaboration system of claim 1, wherein the second mode of communication is selectable based on a capability of a communication device used by a user for a first mode of communication of the different first modes of communication.

7. The communication collaboration system of claim 1, further comprising machine readable instructions to:
seamlessly escalate the second signal representing the second mode of communication to a third signal representing a third mode of communication, wherein the third mode of communication is different from the first and second modes of communication.

8. The communication collaboration system of claim 1, wherein the machine readable instructions to seamlessly merge the audio signal associated with the first signal with the video and audio signals associated with the second signal further comprise machine readable instructions to:
seamlessly merge, in real-time, the audio signal associated with the first signal with the video and audio signals associated with the second signal.

9. The communication collaboration system of claim 1, further comprising machine readable instructions to:
prompt a representative that is part of the communication session including the first signal and the second signal representing the second mode of communication to
record a video based on an interaction with a user during a communication session, and
transcode voice for the recorded video to text to provide for intelligent searching and generation of training library content for a training library.

10. A method for communication collaboration, the method comprising:
initiating communication via video from a first video endpoint to a second video endpoint, the communication including a first signal in a first video format;
receiving the first signal, wherein the first signal represents a first mode of communication for a user;
seamlessly escalating, by a processor, the first signal to a second signal in a second video format, the second signal representing a second mode of communication for the user, wherein the second mode of communication is different from the first mode of communication, and wherein seamlessly escalating the first signal to the second signal further comprises:
launching a new communication channel on each of the video endpoints; and
converting, after launching the new communication channel on each of the video endpoints, the first signal from the first video format associated with the first mode of communication to the second video format associated with the second mode of communication by separating signaling data from video content and passing the video content through a transcoder; and
launching, for a communication session associated with the new communication channel, a virtual meeting by
sending an invite to predetermined invitees,
suggesting social and corporate feeds that contain relevant information for the virtual meeting, and
automatically uploading, to a virtual meeting session, the relevant information for the virtual meeting.

11. The method of claim 10, wherein seamlessly escalating the first signal to the second signal further comprises:

selecting the second video format for the second mode of communication by identifying the modes of communication available at each of the video endpoints.

12. The method of claim 10, further comprising:
receiving a plurality of different first signals, including the first signal, representing different first modes of communication for a plurality of users; and
seamlessly escalating each of the plurality of different first signals to the second signal representing the second mode of communication for each of the plurality of users, wherein the second mode of communication is different from each of the first modes of communication.

13. A non-transitory computer readable medium having stored thereon machine readable instructions for communication collaboration, the machine readable instructions when executed cause a computer system to:
receive a first signal representing a first mode of communication for a user;
seamlessly escalate, by a processor, the first signal to a second signal representing a second mode of communication for the user, wherein the second mode of communication is different from the first mode of communication; and
launch, for a communication session including the first signal representing the first mode of communication and the second signal representing the second mode of communication, a virtual meeting by
sending an invite to predetermined invitees,
suggesting social and corporate feeds that contain relevant information for the virtual meeting, and
automatically uploading, to a virtual meeting session, the relevant information for the virtual meeting.

14. The non-transitory computer readable medium according to claim 13, wherein the machine readable instructions to seamlessly escalate the first signal to the second signal representing the second mode of communication for the user further comprise machine readable instructions that when executed further cause the computer system to:
seamlessly merge, in real-time, an audio signal associated with the first signal with video and audio signals associated with the second signal.

15. The non-transitory computer readable medium according to claim 13, further comprising machine readable instructions to:
record a communication session including the first signal representing the first mode of communication and the second signal representing the second mode of communication.

16. The non-transitory computer readable medium according to claim 13, further comprising machine readable instructions to:
translate the first signal to an intermediate canonical format; and
seamlessly escalate the first signal translated to the intermediate canonical format to the second signal.

17. The non-transitory computer readable medium according to claim 13, further comprising machine readable instructions to:
seamlessly escalate the second signal representing the second mode of communication to a third signal representing a third mode of communication, wherein the third mode of communication is different from the first and second modes of communication.

18. The non-transitory computer readable medium according to claim 13, wherein the second mode of communication is selectable based on a capability of a communication device used by the user for the first mode of communication.

* * * * *